United States Patent
Takeda et al.

(10) Patent No.: US 9,226,374 B2
(45) Date of Patent: Dec. 29, 2015

(54) ILLUMINATION LIGHT SOURCE

(71) Applicant: Panasonic Intellectual Property Management Co., Ltd., Osaka (JP)

(72) Inventors: Kazuhiro Takeda, Osaka (JP); Kazushige Sugita, Hyogo (JP); Akira Takahashi, Osaka (JP); Tatsumi Setomoto, Osaka (JP); Tomohiro Kamitsu, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/391,333

(22) PCT Filed: Mar. 25, 2013

(86) PCT No.: PCT/JP2013/002014
§ 371 (c)(1),
(2) Date: Oct. 8, 2014

(87) PCT Pub. No.: WO2013/153752
PCT Pub. Date: Oct. 17, 2013

(65) Prior Publication Data
US 2015/0123572 A1 May 7, 2015

(30) Foreign Application Priority Data

Apr. 10, 2012 (JP) .................. 2012-089485
Dec. 7, 2012 (JP) .................. 2012-268558

(51) Int. Cl.
*G05F 1/00* (2006.01)
*H05B 37/02* (2006.01)
*H05B 41/36* (2006.01)
*H05B 39/04* (2006.01)
*H05B 33/08* (2006.01)

(52) U.S. Cl.
CPC ........ *H05B 37/0281* (2013.01); *H05B 33/0803* (2013.01); *H05B 33/0854* (2013.01); *H05B 37/0227* (2013.01); *Y02B 20/383* (2013.01)

(58) Field of Classification Search
None
See application file for complete search history.

(56) References Cited

U.S. PATENT DOCUMENTS 7,507,001 B2 * 3/2009 Kit .................. 362/276
8,492,992 B2 7/2013 Otake et al.
(Continued)

FOREIGN PATENT DOCUMENTS

JP 09-289082 11/1997
JP 2004-031094 1/2004
(Continued)

OTHER PUBLICATIONS

International Search Report for corresponding International Application No. PCT/JP2013/002014 mailed Apr. 23, 2013.
(Continued)

*Primary Examiner* — Anh Tran
(74) *Attorney, Agent, or Firm* — Renner, Otto, Boisselle & Sklar, LLP

(57) ABSTRACT

An illumination light source includes: a light-emitting unit; a disturbance detecting unit which detects a specific disturbance; a timer circuit that times a first period and a second period, the first period starting from when the disturbance detecting unit detects the specific disturbance, a second period immediately following after the first period; and a driving circuit that turns ON the light-emitting unit at a start of the first period, causes the light-emitting unit to emit light during the first period, causes the light-emitting unit to emit light that is different from the light emitted during the second period, and turns OFF the light-emitting unit at an end of the second period.

13 Claims, 24 Drawing Sheets

(56) References Cited

U.S. PATENT DOCUMENTS

| | | | |
|---|---|---|---|
| 8,866,392 B2 * | 10/2014 | Chen | 315/152 |
| 2008/0079568 A1 * | 4/2008 | Primous et al. | 340/541 |
| 2011/0068706 A1 | 3/2011 | Otake et al. | |

FOREIGN PATENT DOCUMENTS

| | | |
|---|---|---|
| JP | 2004-034741 | 2/2004 |
| JP | 2010-044399 | 2/2010 |
| JP | 2011-065922 | 3/2011 |
| JP | 2011065922 A * | 3/2011 |
| JP | 2011-204637 | 10/2011 |

OTHER PUBLICATIONS

Form PCT/ISA/237 for corresponding International Application No. PCT/JP2013/002014 dated Apr. 23, 2013.

* cited by examiner

ILLUMINATION LIGHT SOURCE

TECHNICAL FIELD

The present invention relates to illumination light sources having light-emitting elements such as light-emitting diodes (LEDs), and particularly to an illumination light source having a human detection sensor.

BACKGROUND ART

LEDs are used for lamps, etc. as light sources that are highly efficient and space-saving. Specifically, LED lamps using LEDs are drawing attention as substitute illumination light sources for conventionally-known fluorescent lamps and incandescent light bulbs.

On the other hand, lighting apparatuses having human detection sensors are conventionally known. In such a lighting apparatus having a human detection sensor, the human detection sensor is provided for a lighting device to which a lamp (illumination light source) is attached, and the lamp is turned ON when a person is detected by the human detection sensor. For example, when a person enters an illumination area, the human detection sensor detects the presence of the person and the lamp is automatically turned ON, and when the person goes out of the illumination area, the human detection sensor detects the absence of the person and the lamp is automatically turned OFF after a certain period of time.

Furthermore, as such a lighting apparatus having a human detection sensor, a lighting apparatus that calls a user's attention by decreasing the illuminance before automatically turning OFF the lamp is known (for example, refer to Patent Literature (PTL) 1)

CITATION LIST

Patent Literature

[PTL] Japanese Unexamined Patent Application Publication No. 2004-31094

SUMMARY OF INVENTION

Technical Problem

However, in order to use the lighting apparatus having the human detection sensor, it is necessary to replace a conventional lighting device with a lighting device having such a function or attach an adapter between the lighting device and the illumination light source (light bulb), for example. As a result, there arises a problem that cost for using the lighting apparatus is high. Moreover, there arises a problem that, when the lighting device is replaced or the adapter is attached, the volume of the housing of the lighting device or the adapter and the available installation space need to match in a physical space. Moreover, there arises a problem that, when the lighting device having the human detection sensor function or the adapter is used, the lighting device or the adapter and the illumination light source need to be matched with respect to a control operation. That is, lighting cannot be normally controlled unless an illumination light source supporting a control system of the lighting device or the adapter is used. Moreover, there arises a problem that, in the lighting device that varies illuminance before turning OFF the light, a power source for supplying power to the illumination light source may be controlled in a specific state, and therefore a desirable variation of the illuminance cannot be obtained unless a specific illumination light source supporting a power control system of the lighting device is used.

The present invention was conceived in view of the aforementioned problems. An object of the present invention is to provide an illumination light source that is easily capable of preliminarily notifying a user that light is being turned OFF.

Solution to Problem

In order to achieve the aforementioned object, the illumination light source according to an aspect of the present invention includes: a light-emitting unit; a disturbance detecting unit which detects a specific disturbance; a timer circuit that times a first period and a second period, the first period starting from when the disturbance detecting unit detects the specific disturbance, the second period immediately following after the first period; and a driving circuit that turns ON the light-emitting unit at a start of the first period, causes the light-emitting unit to emit light during the first period, causes the light-emitting unit to emit light that is different from the light emitted during the second period, and turns OFF the light-emitting unit at an end of the second period.

Moreover, the driving circuit may cause the light-emitting unit to emit the light at a first illuminance in the first period and, in the second period, causes the light-emitting unit to emit the light at a second illuminance which is different from the first illuminance.

Moreover, the second illuminance may be 90% of the first illuminance or less.

Moreover, the second illuminance may be 110% of the first illuminance or more.

Moreover, the timer circuit may time a third period and a fourth period which is immediately after the third period, the third period and the fourth period being included in the second period, and the driving circuit may cause the light-emitting unit to emit light at the second illuminance in the third period and continuously decrease illuminance of the light-emitting unit in the fourth period.

Moreover, the driving circuit may vary the illuminance of the light-emitting unit by varying an amount of power to be supplied to the light-emitting unit.

Moreover, the driving circuit may include a controlling unit that adjusts the amount of the power to be supplied to the light-emitting unit according to a control signal and vary the amount of the power to be supplied to the light-emitting unit by supplying, to the controlling unit, control signals having different values for the first period and the second period.

Moreover, the light-emitting unit may include: a light-emitting element; a resistor; and a switch that switches between connecting and not connecting the light-emitting element and the resistor in parallel, and the driving circuit may vary the amount of the power to be supplied to the light-emitting unit by operating the switch.

Moreover, the light-emitting unit may include plural light-emitting elements, and the driving circuit may vary the illuminance of the light-emitting unit by varying the number of light-emitting elements that emit light among the plural light-emitting elements.

Moreover, the plural light-emitting elements may include a first light-emitting element and a second light-emitting element, the light-emitting unit may further include a switch that switches between connecting and not connecting the first light-emitting element and the second light-emitting element in parallel, and the driving circuit may vary the number of light-emitting elements that emit the light among the plural light-emitting elements by operating the switch.

Moreover, the plural light-emitting elements may include a first light-emitting element and a second light-emitting element, the light-emitting unit may further includes a switch that switches between connecting and not connecting the first light-emitting element and the second light-emitting element in series, and the driving circuit may vary the number of light-emitting elements that emit the light among the plural light-emitting elements by operating the switch.

Moreover, the driving circuit may cause the light-emitting element to emit the light at a first color temperature in the first period and, in the second period, cause the light-emitting element to emit the light at a second color temperature which is different from the first color temperature.

Moreover, a difference between the first color temperature and the second color temperature may be 100 K or more.

Moreover, the light-emitting unit may include: a first light-emitting element which emits light at the first color temperature; and a second light-emitting element which emits light at the second color temperature, and the driving circuit may vary color temperature of the light-emitting unit by causing one of the first light-emitting element and the second light-emitting element to emit light.

Moreover, the timer circuit may include a capacitor and a resistor, and time the first period and the second period using a time constant of the capacitor and the resistor.

Moreover, the light-emitting unit may include a light-emitting diode.

Moreover, the present invention can be implemented as a lighting apparatus including such an illumination light source.

Advantageous Effects of Invention

With this, the present invention can provide the illumination light source that is easily capable of preliminarily notifying a user that light is being turned OFF.

DESCRIPTION OF EMBODIMENTS

The following describes an illumination light source according to embodiments of the present invention with reference to the drawings. It is to be noted that each of the embodiments described below shows a preferable example of the present invention. Therefore, the numerical values, shapes, materials, structural elements, the arrangement and connection of the structural elements shown in the following exemplary embodiments are mere examples, and therefore are not intended to limit the scope of the present invention. Thus, among the structural elements in the following embodiments, structural elements not recited in any one of the independent claims defining the most generic part of the inventive concept are not necessarily needed to achieve the object of the present invention, but described as structural elements constituting a more preferable embodiment. It is to be noted that the diagrams are schematic diagrams, and the illustrations are not necessarily strictly accurate.

Embodiment 1

An illumination light source according to Embodiment 1 of the present invention includes a human detection sensor and automatically emits light for a fixed period of time when a person, etc. is detected by the human detection sensor. Furthermore, the illumination light source notifies a user that the light is being turned OFF by varying the illuminance before being automatically turned OFF. With such an illumination light source, a lighting apparatus having a function to preliminarily notify the user that the light is being turned OFF is realized only by attaching the illumination light source to a lighting device in place of a conventional illumination light source. Thus, the illumination light source is easily capable of preliminarily notifying the user that the light is being turned OFF.

Figure 1:
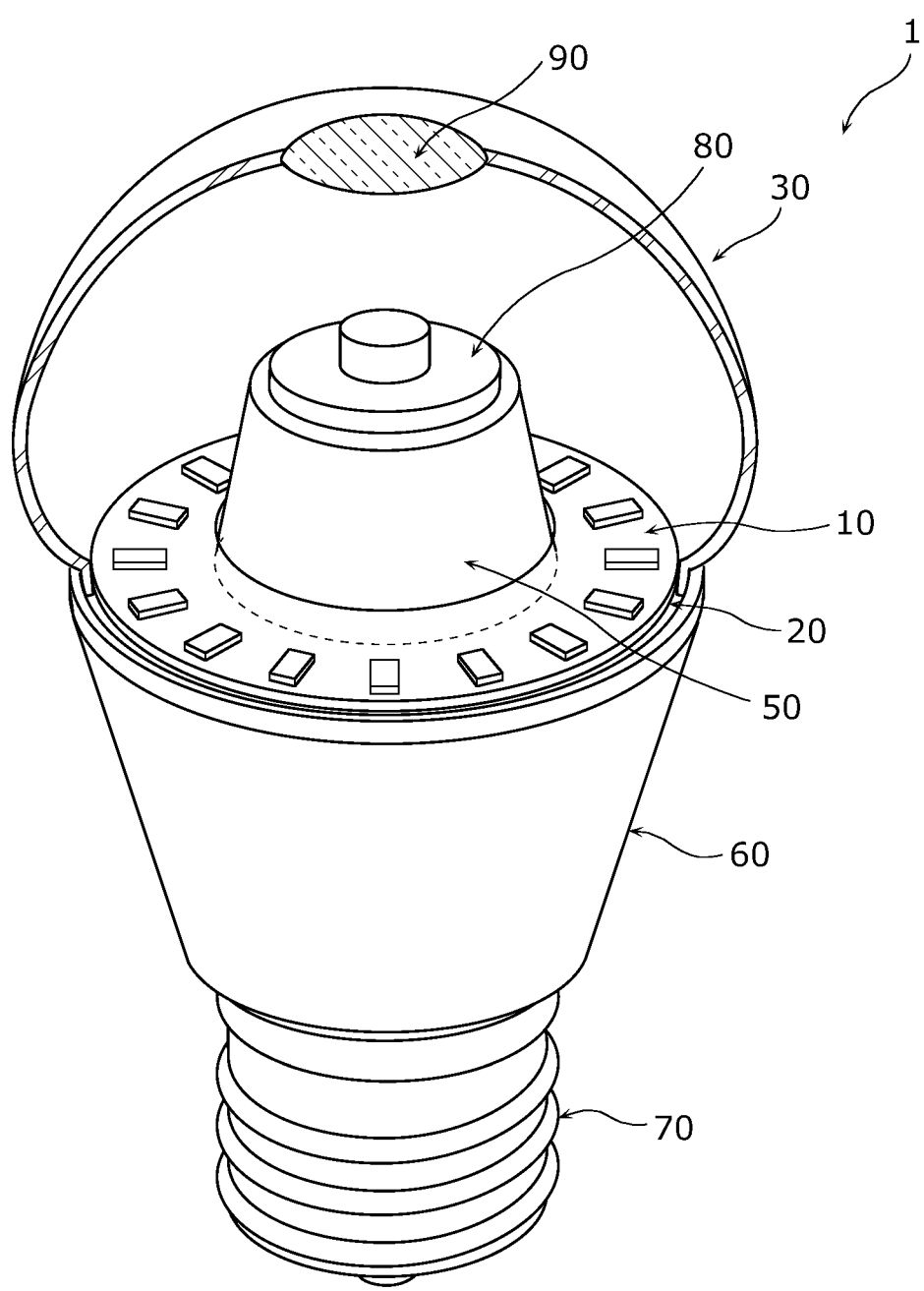
FIG. 1 is a partially cutaway perspective view of an illumination light source according to Embodiment 1 of the present invention.

First, a basic configuration of the illumination light source according to Embodiment 1 of the present invention shall be described with reference to FIG. 1. FIG. 1 is a partially cutaway perspective view of the illumination light source according to Embodiment 1 of the present invention.

As shown in FIG. 1, an illumination light source 1 according to this embodiment is an LED light bulb which is substituted for a fluorescent light bulb or an incandescent light bulb. The illumination light source 1 includes a light-emitting module 10 as a light source, a base platform 20 on which the light-emitting module 10 is mounted, a globe 30 covering the light-emitting module 10, a circuit unit (not shown) for causing the light-emitting module 10 to emit light, an insulation case 50 containing the circuit unit, a housing 60 covering the insulation case 50, a base 70 electrically connected to the circuit unit, a sensor unit 80 which detects presence or absence of a person, and a light guiding member 90 which guides light such as infrared light emitted from the person. Thus, the illumination light source 1 is an LED light bulb having a built-in sensor, that is, the sensor unit 80.

The globe 30, the housing 60, and the base 70 form an envelope of the illumination light source 1, and the envelope contains the light-emitting module 10, the base platform 20, the circuit unit and the insulation case 50. Moreover, in this embodiment, the sensor unit 80 is also contained in the envelope.

The light-emitting module 10 is an LED module for emitting predetermined light for example, and positioned inside the globe 30. The light-emitting module 10 emits light according to a detection signal from the sensor unit 80. The light-emitting module 10 includes plural semiconductor light-emitting elements. The semiconductor light-emitting elements are, for example, LEDs (LED chips), and mounted on one surface of a mounding substrate. It is to be noted that the semiconductor light-emitting element may be different from the LED, and a semiconductor laser, an organic EL element, or an inorganic EL element may be used.

The plural semiconductor light-emitting elements are placed around the insulation case 50. In this embodiment, for example, the LED chips are circularly mounted on a front surface of the mounding substrate.

It is to be noted that the number of semiconductor light-emitting elements is not limited to be plural, but may be one. Moreover, regarding posture of the semiconductor light-emitting elements, all of the semiconductor light-emitting elements need not face a direction along a lamp axis J, but some may be mounted to face a direction inclined with respect to the lamp axis J.

Next, a functional configuration of the illumination light source according to this embodiment will be described.

Figure 2:
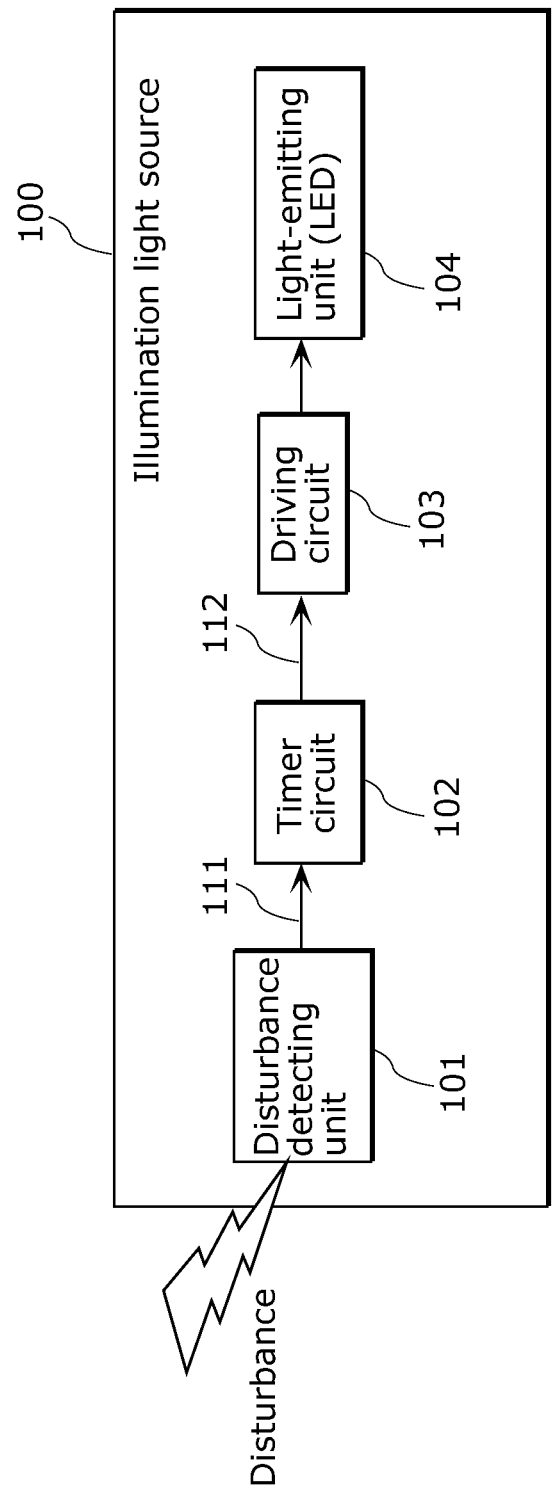
FIG. 2 is a block diagram of the illumination light source according to Embodiment 1 of the present invention.

FIG. 2 is a block diagram of an illumination light source 100 according to this embodiment. The illumination light source 100 includes a disturbance detecting unit 101, a timer circuit 102, a driving circuit 103, and a light-emitting unit 104. Here, the illumination light source 100 corresponds to the illumination light source 1 shown in FIG. 1, the disturbance detecting unit 101 corresponds to the sensor unit 80 shown in FIG. 1, and the light-emitting unit 104 corresponds to the light-emitting module 10 shown in FIG. 1. Moreover, the timer circuit 102 and the driving circuit 103 are included in the above circuit unit.

The disturbance detecting unit 101 detects a specific disturbance, and provides a trigger signal 111 indicating the result of the detection to the timer circuit 102. Specifically, the disturbance detecting unit 101 is a human detection sensor such as a pyroelectric infrared sensor which detects a heat source of a human body. It is to be noted that the disturbance detecting unit 101 may be different from the human detection sensor as long as it detects a variation of the state outside the illumination light source 100.

The timer circuit 102 times a normal lighting period (a first period) which starts when a specific disturbance is detected by the disturbance detecting unit 101 using the trigger signal 111 and a gradual light-control period (a second period) which is immediately after the normal lighting period. For example, the timer circuit 102 includes a capacitor and a resistor, and times the above periods using a time constant of the capacitor and the resistor. Otherwise, the timer circuit 102 may be a microcomputer that times using a clock signal.

Moreover, the timer circuit 102 provides, to the driving circuit 103, a control signal 112 which indicates the normal lighting period and the gradual light-control period that have been timed. For example, the control signal 112 indicates a starting time of the normal lighting period and an ending time of the normal lighting period (a starting time of the gradual light-control period) and an ending time of the gradual light-control period. It is to be noted that it is sufficient the timer circuit 102 is capable of timing and externally transmitting a signal indicating plural periods of time.

The driving circuit 103 turns ON/OFF the light-emitting unit 104 and controls illuminance of the light-emitting unit 104.

The light-emitting unit 104 includes, for example, plural light-emitting elements (LEDs). Each light-emitting element is turned ON/OFF according to a control by the driving circuit 103. It is to be noted that the light-emitting unit 104 may include only one light-emitting element.

Figure 3:
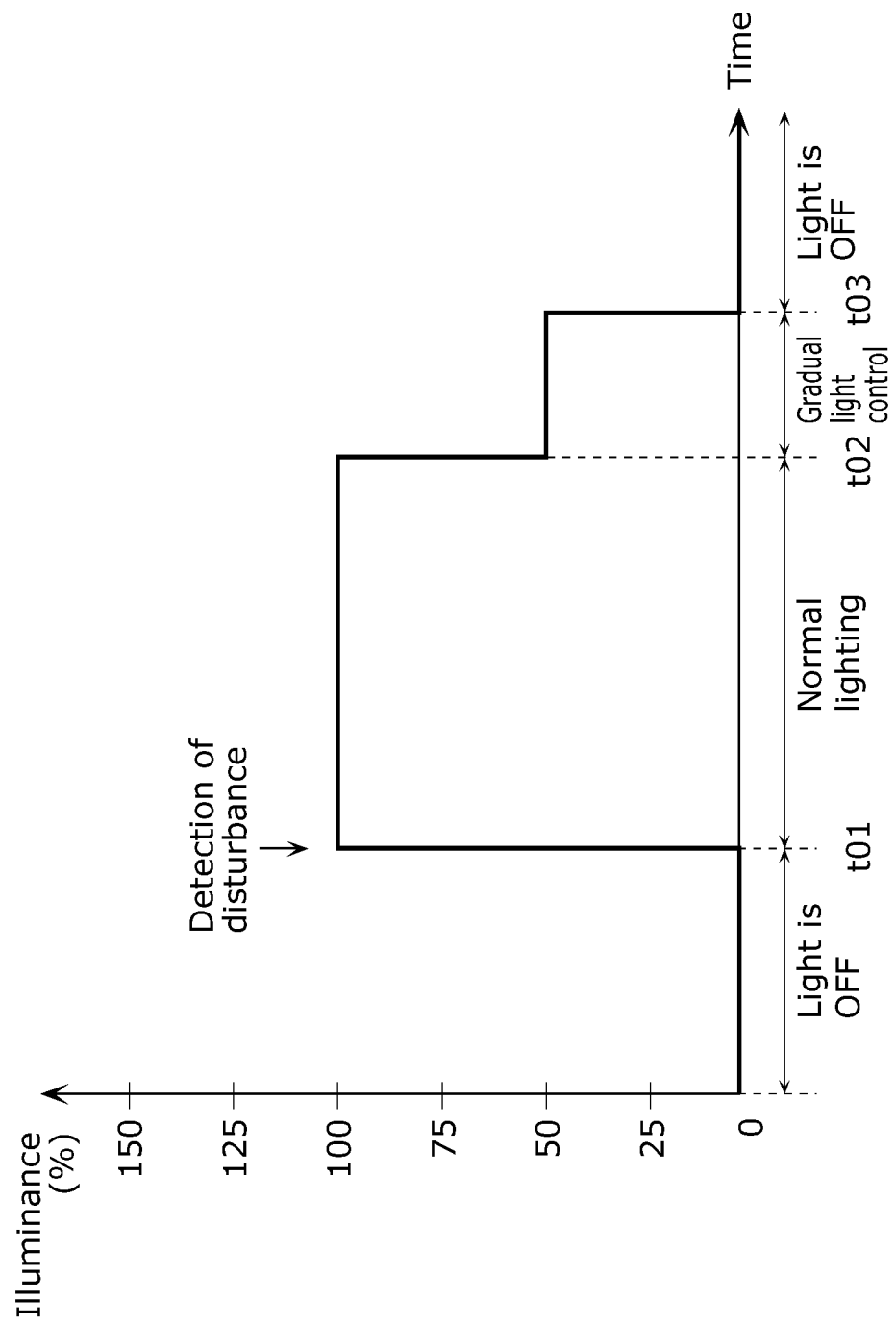
FIG. 3 is a timing chart showing illuminance of the illumination light source according to Embodiment 1 of the present invention.

FIG. 3 is a timing chart showing the illuminance of the illumination light source 100. It is to be noted that, in FIG. 3, the illuminance in the normal lighting period is indicated to be 100%.

As shown in FIG. 3, in a period before time t01, the light-emitting unit 104 is OFF. Then, at the time t01, the disturbance detecting unit 101 detects a disturbance. The driving circuit 103 turns ON the light-emitting unit 104 at a start (the time t01) of the normal lighting period, and causes the light-emitting unit 104 to emit light during the normal lighting period (the time t01 to t02). Subsequently, in the gradual light-control period, the driving circuit 103 causes the light-emitting unit 104 to emit light that is different from the light emitted in the normal lighting period, and causes the light-emitting unit 104 to stop emitting the light at the end of the gradual light-control period (time t03). Specifically, the driving circuit 103 causes the light-emitting unit 104 to emit light at a first illuminance in the normal lighting period and causes the light-emitting unit 104 to emit light at a second illuminance which is different from the first illuminance in the gradual light-control period. For example, the second illuminance in the gradual light-control period is preferably from 90% to 20% of the first illuminance so that a person can perceive the variation of the illuminance.

Moreover, the gradual light-control period preferably extends a time period in which a user can take a necessary action under recognition of the light is being turned OFF soon. Here, the necessary action is, for example, an action of the user waving his/her arm. The light is not turned OFF as a result of the sensor (the disturbance detecting unit 101) detecting the action.

Hereinafter, details of the timer circuit 102 will be described.

Figure 4:
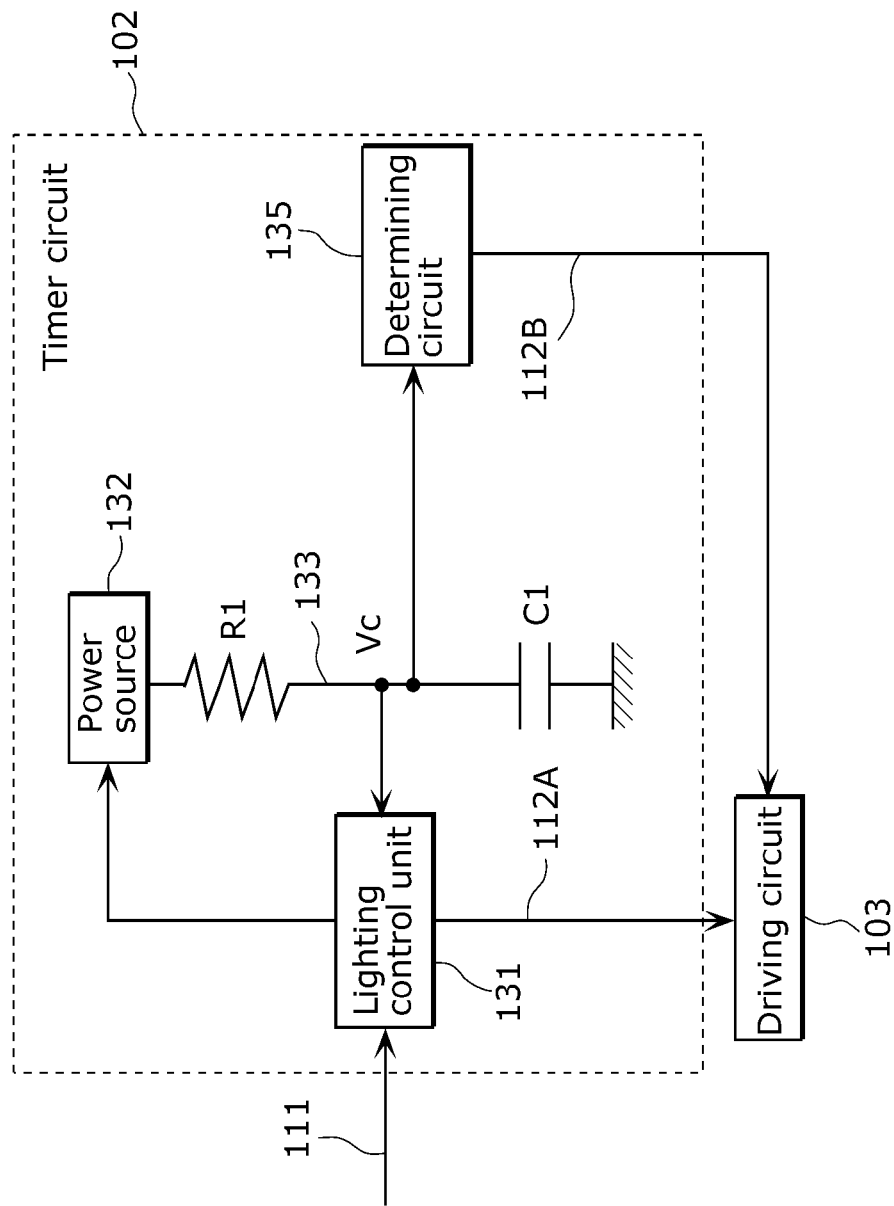
FIG. 4 is a diagram showing a configuration of a timer circuit according to Embodiment 1 of the present invention.

FIG. 4 is a diagram showing a configuration of the timer circuit 102. The configuration shown in FIG. 4 is an example of the timer circuit using a capacitor and a resistor. The timer circuit 102 includes a lighting control unit 131, a power source 132, a determining circuit 135, resistors R1 and R2, and a capacitor C1.

The capacitor C1 is connected between a node 133 and a ground potential line. The resistor R1 is connected between the node 133 and the power source 132. The power source 132 selectively supplies a power source voltage Vcc and a ground potential GND to a terminal of the resistor R1. It is to be noted that the node 133 may be connected to a power source line such as a ground potential line via a resistor having a resistance value sufficiently greater than the resistance value of the resistor R1.

The lighting control unit 131 switches a voltage supplied from the power source 132 in response to the trigger signal 111. Moreover, the lighting control unit 131 generates, according to the voltage Vc of the node 133, a lighting switching signal 112A which indicates a start of lighting (start of the normal lighting period) and an end of lighting (end of the gradual light-control period), and provides the generated lighting switching signal 112A to the driving circuit 103.

The determining circuit 135 generates, according to the voltage Vc, a gradual light-control switching signal 112B which indicates a start of the gradual light-control period, and provides the generated gradual light-control switching signal 112B to the driving circuit 103.

Figure 5:
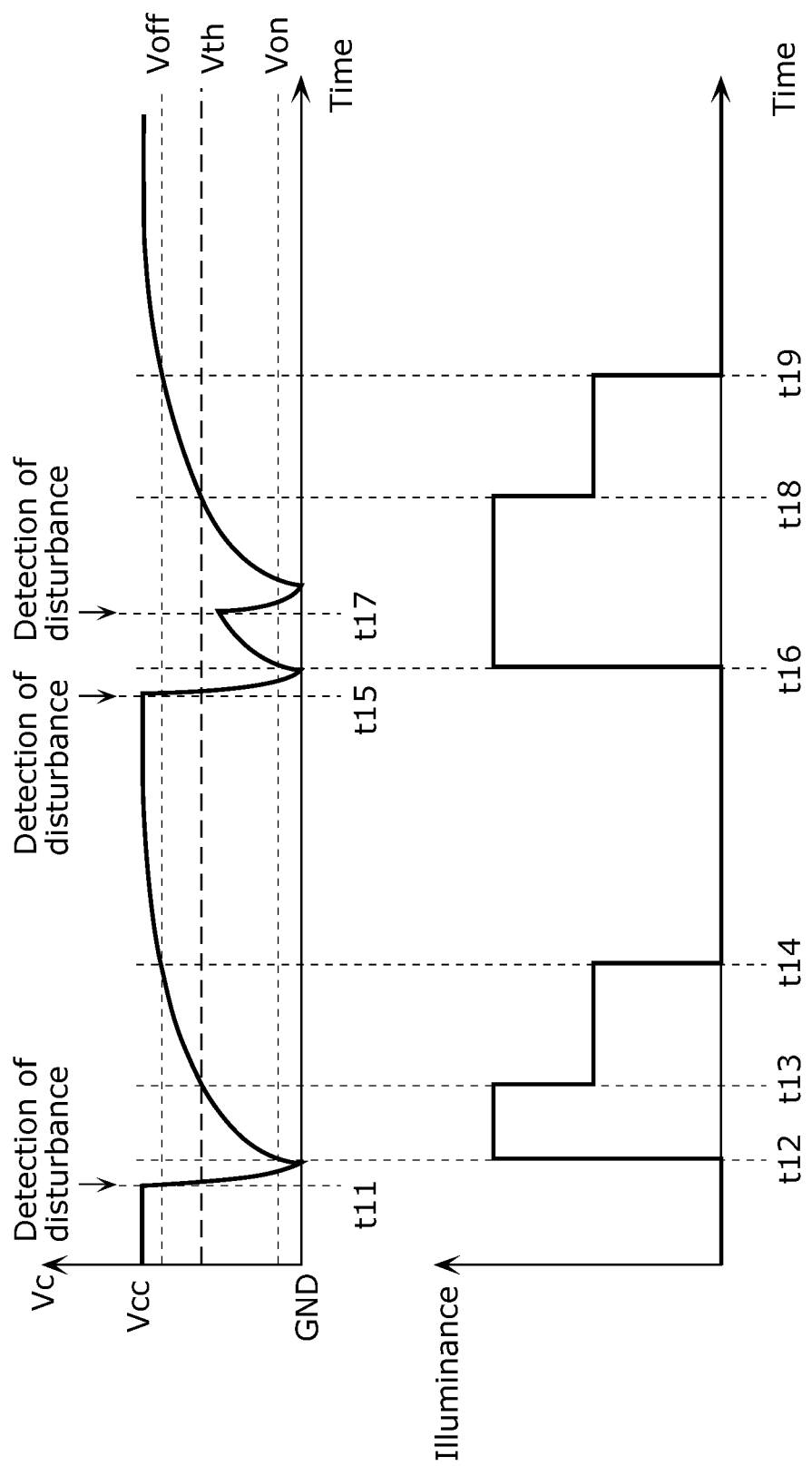
FIG. 5 is a timing chart showing an operation of the timer circuit according to Embodiment 1 of the present invention.

FIG. 5 is a timing chart showing the voltage Vc and the illuminance. As shown in FIG. 5, the lighting control unit 131 causes the power source 132 to supply the power source voltage Vcc in a time period before the disturbance is detected (before time t11). As a result, the node 133 is charged up to the power source voltage Vcc.

When a disturbance is detected at the time t11, the lighting control unit 131 switches the voltage to be supplied from the power source 132 from the power source voltage Vcc to the ground potential GND. As a result, the voltage Vc drops to the ground potential GND. After a predetermined period of time, the lighting control unit 131 switches the voltage to be supplied from the power source 132 from the ground potential GND to the power source voltage Vcc. As a result, the voltage Vc starts rising.

The lighting control unit 131 compares the voltage Vc and each of a predetermined voltage Von for turning ON the light and a predetermined voltage Voff for turning OFF the light. At time t12, the lighting control unit 131 detects that the voltage Vc and the voltage Von have matched, and provides the lighting switching signal 112A which indicates the time of the detection to the driving circuit 103. As a result, the driving circuit 103 turns ON the light-emitting unit 104 at the time t12. It is to be noted that the lighting control unit 131 may provide the lighting switching signal 112A which indicates the time (time t11) of the detection of the disturbance to the driving circuit 103, without using the voltage Von.

Moreover, the determining circuit 135 compares the voltage Vc and a predetermined threshold voltage Vth. At time t13, the determining circuit 135 detects that the voltage Vc and the threshold voltage Vth have matched, and provides the gradual light-control switching signal 112B which indicates the time of the detection to the driving circuit 103. As a result, the driving circuit 103 decreases the illuminance of the light emitted from the light-emitting unit 104 at the time t13.

Furthermore, at time t14, the lighting control unit 131 detects that the voltage Vc and the voltage Voff have matched, and provides the lighting switching signal 112A which indicates the time of the detection to the driving circuit 103. As a result, the driving circuit 103 turns OFF the light-emitting unit 104 at the time t14.

Moreover, as shown in FIG. 5, when a disturbance is detected again (time t17) during the lighting period (time t16 to t19) after the detection of a disturbance (time t15), the voltage Vc is decreased again and thus the lighting period is extended.

It is to be noted that the circuit configuration of the timer circuit 102 shown here is a mere example, and the configuration in the present invention is not limited to this.

For example, although the lighting control unit 131 which controls ON/OFF of the light and the determining circuit 135 which controls the switching from the normal lighting to the gradual light control are separately provided in the above description, the lighting control unit 131 and the determining circuit 135 may constitute a single circuit. That is, parts of these circuits may be shared.

Moreover, although the determining circuit 135 and the driving circuit 103 are separately provided, parts of these circuits may be shared.

Moreover, the configuration for charging and discharging the capacitor C1 with electric charges is not limited to the above configuration, but a different circuit configuration may be used.

Here, such a configuration using the resistor and the capacitor as described above may be implemented with a combination of discrete components. It is to be noted that the timer circuit 102 may be configured with general-purpose components not including microcomputers.

Moreover, the functions of the timer circuit 102 may be implemented by a microcomputer executing software. In this case, for example, the microcomputer controls the driving circuit 103 by outputting signals indicating a start and an end of each period from a general-purpose output terminal of the microcomputer. Moreover, this control may be performed using two digital terminals or a single D/A output terminal of the microcomputer.

Next, an exemplary configuration for the gradual light control will be described.

Figure 6:
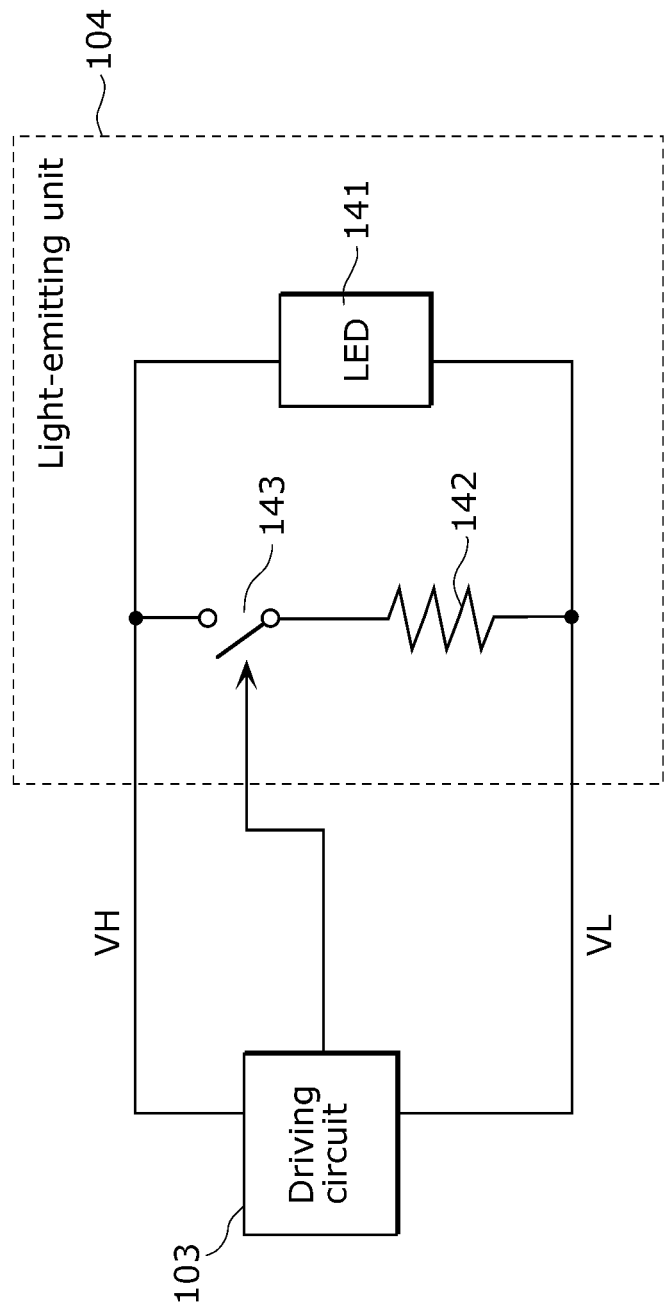
FIG. 6 is a diagram showing an exemplary configuration of a driving circuit and a light-emitting unit according to Embodiment 1 of the present invention.

FIG. 6 is a diagram showing an exemplary configuration of the driving circuit 103 and the light-emitting unit 104. The light-emitting unit 104 shown in FIG. 6 includes an LED 141 (the light-emitting element), a resistor 142, and a switch 143. The resistor 142 and the switch 143 are connected in series, and the series circuit of the resistor 142 and the switch 143 is connected in parallel with the LED 141.

It is to be noted that the light-emitting unit 104 may include plural LEDs 141 mutually connected in series or in parallel.

In the lighting period (both the normal lighting period and the gradual light-control period), the driving circuit 103 supplies a voltage VL to a terminal of the LED 141 and supplies a voltage VH to the other terminal of the LED 141. In this configuration, the driving circuit 103 turns OFF the switch 143 in the normal lighting period and turns ON the switch 143 in the gradual light-control period. This causes a current flowing to the LED 141 in the gradual light-control period to be smaller than a current flowing to the LED 141 in the normal lighting period. Thus, the driving circuit 103 causes the illuminance in the gradual light-control period to be smaller than the illuminance in the normal lighting period by causing the power (current) to be supplied to the LED 141 in the gradual light-control period to be smaller than that in the normal lighting period.

It is to be noted that although the configuration in which the driving circuit 103 decreases the current flowing to the LED 141 while supplying the power (current) to the light-emitting unit 104 at a fixed amount has been described, the driving circuit 103 may cause the illuminance in the gradual light-control period to be smaller than the illuminance in the normal lighting period by decreasing the power (current) to be supplied to the light-emitting unit 104. For example, the driving circuit 103 may include a controlling unit that is capable of adjusting an amount of power to be supplied to the light-emitting unit 104 according to a control signal, and supplies control signals having different values for the normal lighting period and the gradual light-control period to the controlling unit. With this, the driving circuit 103 may vary the amount of the power to be supplied to the light-emitting unit 104. For example, the above operation can be realized using a power adjusting function of the driving circuit 103. Specifically, the above operation can be realized by changing a signal supplied to a power adjusting function terminal included in an IC for the driving circuit.

It is to be noted that the driving circuit 103 may vary the illuminance of the light-emitting unit 104 by varying the number of light-emitting elements that emit light among the plural light-emitting elements included in the light-emitting unit 104.

Figure 7:
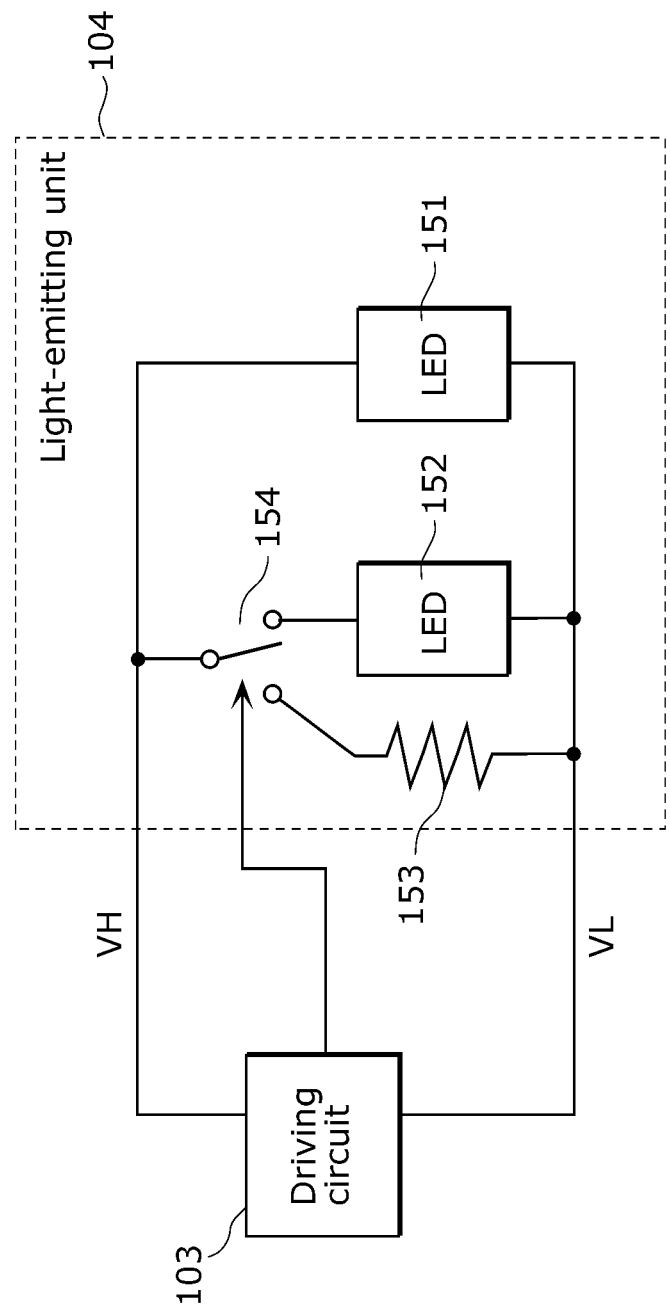
FIG. 7 is a diagram showing an exemplary configuration of the driving circuit and light-emitting units according to Embodiment 1 of the present invention.

FIG. 7 is a diagram showing an exemplary configuration of the driving circuit 103 and the light-emitting unit 104. The light-emitting unit 104 shown in FIG. 7 includes an LED 151 (a first light-emitting element), an LED 152 (a second light-emitting element), a resistor 153, and a switch 154.

The switch 154 switches between connecting and not connecting the LED 151 and the LED 152 in parallel. Then, the driving circuit 103 varies the number of LEDs that emit light among the plural LEDs 151 and 152 by operating the switch 154.

Specifically, a circuit including the LED 152, the resistor 153, and the switch 154 is connected to the LED 151 in parallel. The switch 154 switches between (1) a first state in which the LED 152 is connected to the LED 151 in parallel and (2) a second state in which the LED 151 is connected to the resistor 153 in parallel.

It is to be noted that the light-emitting unit 104 may include plural LEDs 151 mutually connected in series or in parallel and may include plural LEDs 152 mutually connected in series or in parallel. Moreover, the number of LEDs 151 and the number of LEDs 152 may be equal or different.

Moreover, the resistance value of the resistor 153 may be infinite (open).

The driving circuit 103 causes the switch 154 to be in the first state (the state in which the LED 152 is connected to the LED 151 in parallel) in the normal lighting period and to be in the second state (the state in which the resistor 153 is connected to the LED 151 in parallel) in the gradual light-control period. This causes the number of light-emitting elements (LEDs) that emit light in the gradual light-control period to be smaller than the number of light-emitting elements that emit light in the normal lighting period. Thus, this causes the illuminance in the gradual light-control period to be smaller than the illuminance in the normal lighting period.

Figure 8:
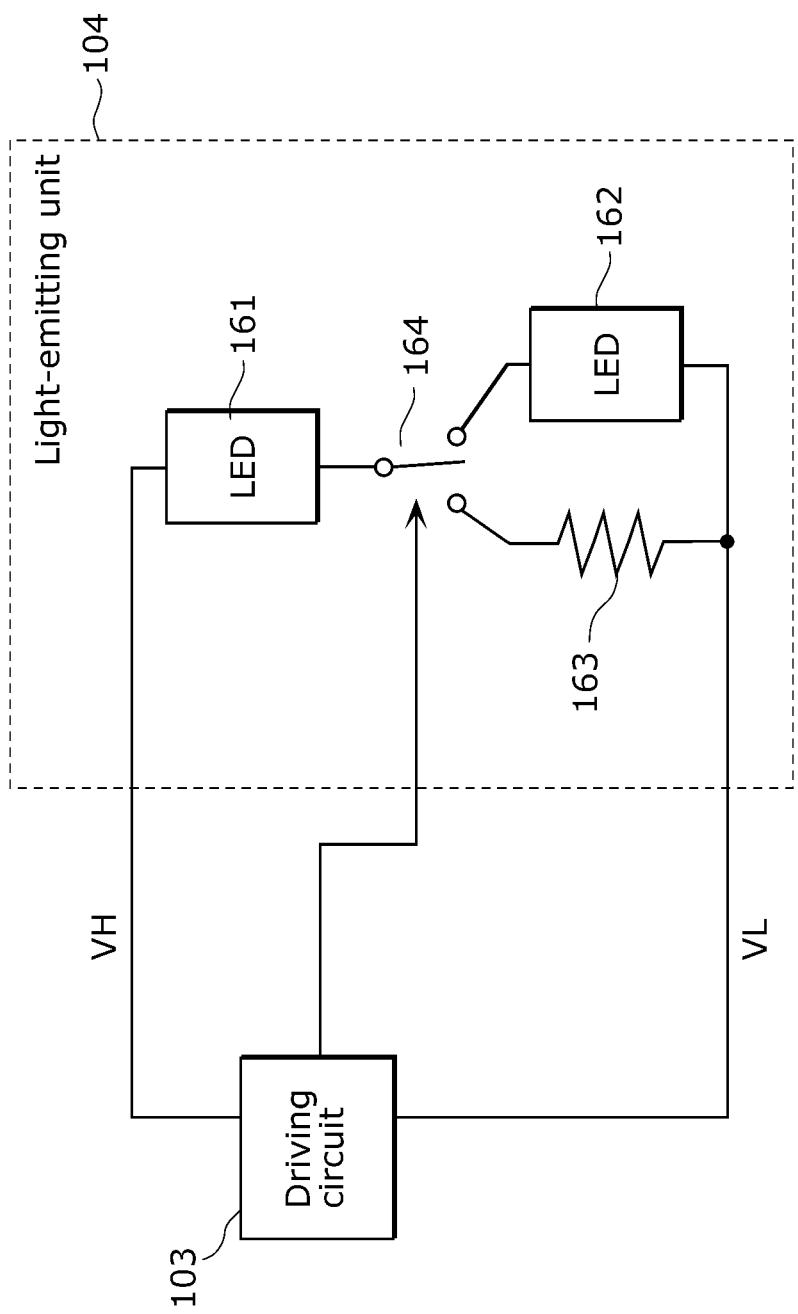
FIG. 8 is a diagram showing an exemplary configuration of the driving circuit and light-emitting units according to Embodiment 1 of the present invention.

Moreover, a configuration shown in FIG. 8 may be used as a configuration for varying the number of light-emitting elements that emit light. The light-emitting unit 104 shown in FIG. 8 includes an LED 161 (the first light-emitting element), an LED 162 (the second light-emitting element), a resistor 163, and a switch 164.

The switch 164 switches between connecting and not connecting the LED 161 and the LED 162 in series. Then, the driving circuit 103 varies the number of LEDs that emit light among the plural LEDs 161 and 162 by operating the switch 164.

Specifically, the voltage VH is supplied to a terminal of the LED 161. The switch 164 switches between (1) a first state in which the other terminal of the LED 161 and a terminal of the LED 162 are connected and (2) a second state in which the other terminal of the LED 161 and a terminal of the resistor 163 are connected. The voltage VL is supplied to the other terminal of the LED 162 and the other terminal of the resistor 163.

It is to be noted that the light-emitting unit 104 may include plural LEDs 161 mutually connected in series or in parallel and may include plural LEDs 162 mutually connected in series or in parallel. Moreover, the number of LEDs 161 and the number of LEDs 162 may be equal or different.

Moreover, the resistance value of the resistor 163 may be 0 (short circuit).

The driving circuit 103 causes the switch 164 to be in the first state (the state in which the LED 162 is connected to the LED 161 in series) in the normal lighting period and to be in the second state (the state in which the resistor 163 is connected to the LED 161 in series) in the gradual light-control period. This causes the number of light-emitting elements (LEDs) that emit light in the gradual light-control period to be smaller than the number of light-emitting elements that emit light in the normal lighting period. Thus, this causes the illuminance in the gradual light-control period to be smaller than the illuminance in the normal lighting period.

Figure 9:
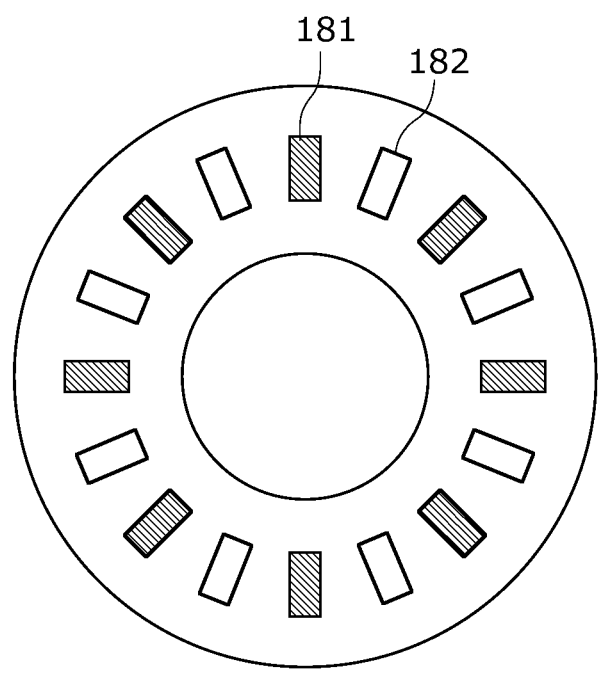
FIG. 9 is a diagram showing an example of a light-emitting element that emits light at a time of gradual light control according to Embodiment 1 of the present invention.

It is to be noted that when the number of light-emitting elements that emit light in the gradual light-control period is reduced as described above, a light-emitting element 181 which does not emit light and the light-emitting element 182 which emits light are preferably arranged with regularity as shown in FIG. 9. For example, in the example shown in FIG. 9, a light-emitting element 181 which does not emit light and the light-emitting element 182 which emits light are alternately arranged.

Moreover, although the determining circuit 135, the driving circuit 103, and the light-emitting unit 104 are separated in the above description, parts of the functions of these units may be shared. For example, functions of the determining circuit 135, the driving circuit 103, and the switches (switches 143, 154, and 164) included in the light-emitting unit 104 can be implemented in a single transistor.

Figure 10:
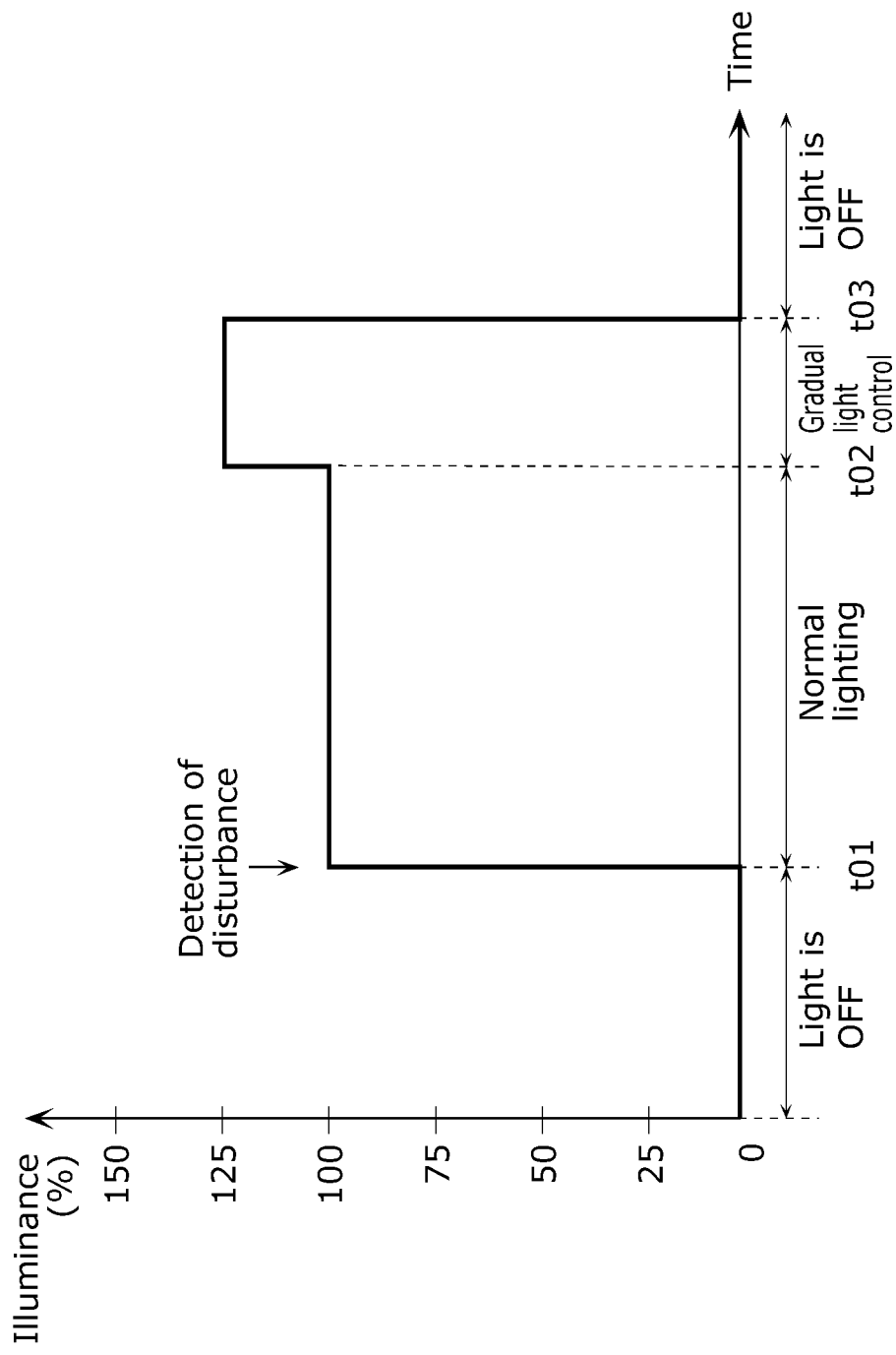
FIG. 10 is a timing chart showing illuminance of an illumination light source according to a variation of Embodiment 1 of the present invention.

Moreover, although an example in which the illuminance in the gradual light-control period is caused to be smaller than the illuminance in the normal lighting period has been described, the illuminance in the gradual light-control period may be caused to be greater than the illuminance in the normal lighting period as shown in FIG. 10. In this case, the illuminance in the gradual light-control period is preferably more than or equal to 110% of the illuminance in the normal lighting period so that the person can perceive the variation of the illuminance.

Figure 11:
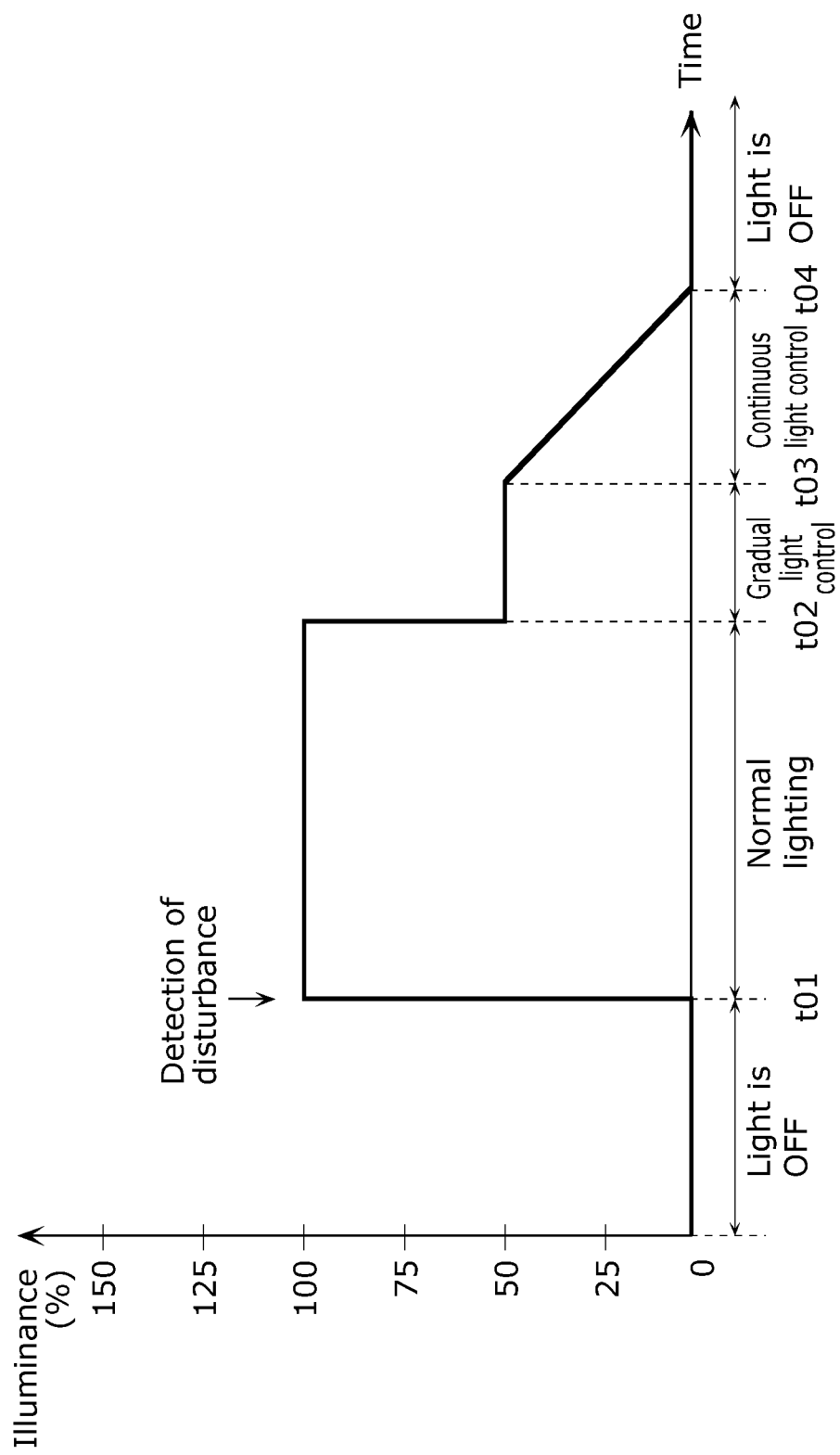
FIG. 11 is a timing chart showing illuminance of an illumination light source according to a variation of Embodiment 1 of the present invention.

Moreover, as shown in FIG. 11, a continuous light-control period (time t03 to t04) may be provided immediately after the gradual light-control period. In this case, the timer circuit 102 times the normal lighting period (the first period), the gradual light-control period (a third period), and the continuous light-control period (a fourth period). Subsequently, the driving circuit 103 causes the light-emitting unit 104 to emit light at the second illuminance (20% to 90%) in the gradual light-control period (the third period), and controls the light-emitting unit 104 such that the illuminance is continuously decreased in the continuous light-control period (the fourth period).

It is to be noted that although an example in which both of the gradual light-control period and the continuous light-control period are provided in FIG. 11, only the continuous light-control period may be provided. Moreover, the gradual light-control period may be provided after the continuous light-control period. Furthermore, three or more time periods each of which is the gradual light-control period or the continuous light-control period may be provided.

Thus, the illumination light source 100 according to this embodiment includes the disturbance detecting unit 101, and when a disturbance is detected by the disturbance detecting unit 101, automatically emits light for a certain period of time. Furthermore, the illumination light source 100 notifies the user that the light is being turned OFF by varying the illuminance before automatically turning OFF the light. By using such an illumination light source 100, the lighting apparatus having the function to preliminarily notify the user that the light is being turned OFF is realized only with an easy operation to attach the illumination light source 100 to the lighting device in place of a conventional illumination light source. Thus, the illumination light source 100 is easily capable of preliminarily notifying the user that the light is being turned OFF.

Embodiment 2

In this embodiment, an illumination light source that varies a color temperature before turning OFF the light. It is to be noted that, a general configuration, etc. of the illumination light source according to this embodiment is the same as those in Embodiment 1. The following is mainly a description different from that in Embodiment 1, and overlapping description is omitted.

Figure 12:
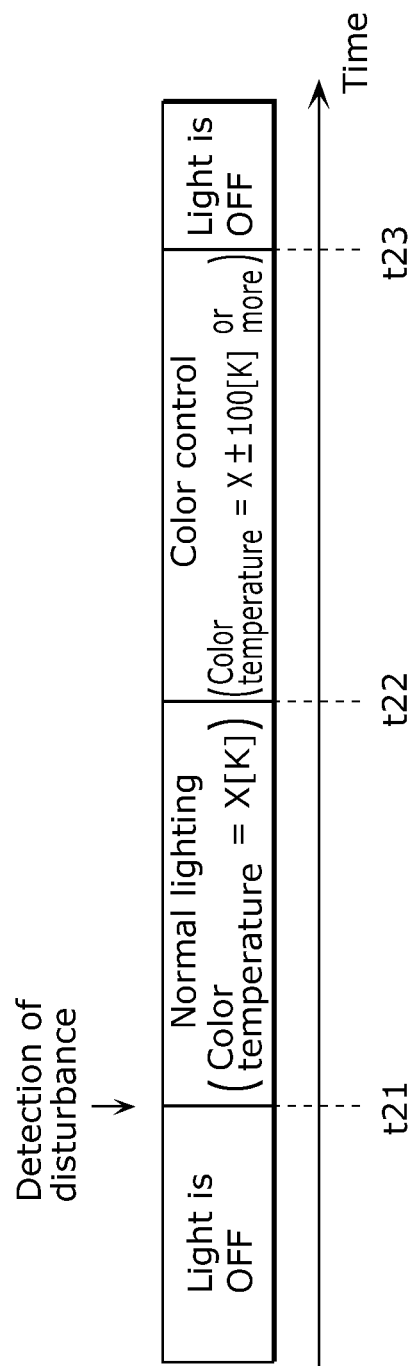
FIG. 12 is a timing chart showing illuminance of an illumination light source according to Embodiment 2 of the present invention.

FIG. 12 is a timing chart showing a color temperature of the illumination light source 100 according to this embodiment.

As shown in FIG. 12, the disturbance detecting unit 101 detects a disturbance at time t21. The driving circuit 103 turns ON the light-emitting unit 104 at a start (time t21) of the normal lighting period and causes the light-emitting unit 104 to emit light during the normal lighting period (the time t21 to t22). Subsequently, the driving circuit 103 causes the light-emitting unit 104 to emit light during a color-control period (the time t22 to t23) at a color temperature different from that in the normal lighting period, and turns OFF the light-emitting unit 104 at the end (the time t23) of the color-control period. For example, the color temperature in the color-control period is preferably +100 K or more, or –100 K or less of the color temperature in the normal lighting period so that a person can perceive a variation of the color temperature.

The following describes a configuration for performing the color control.

Figure 13:
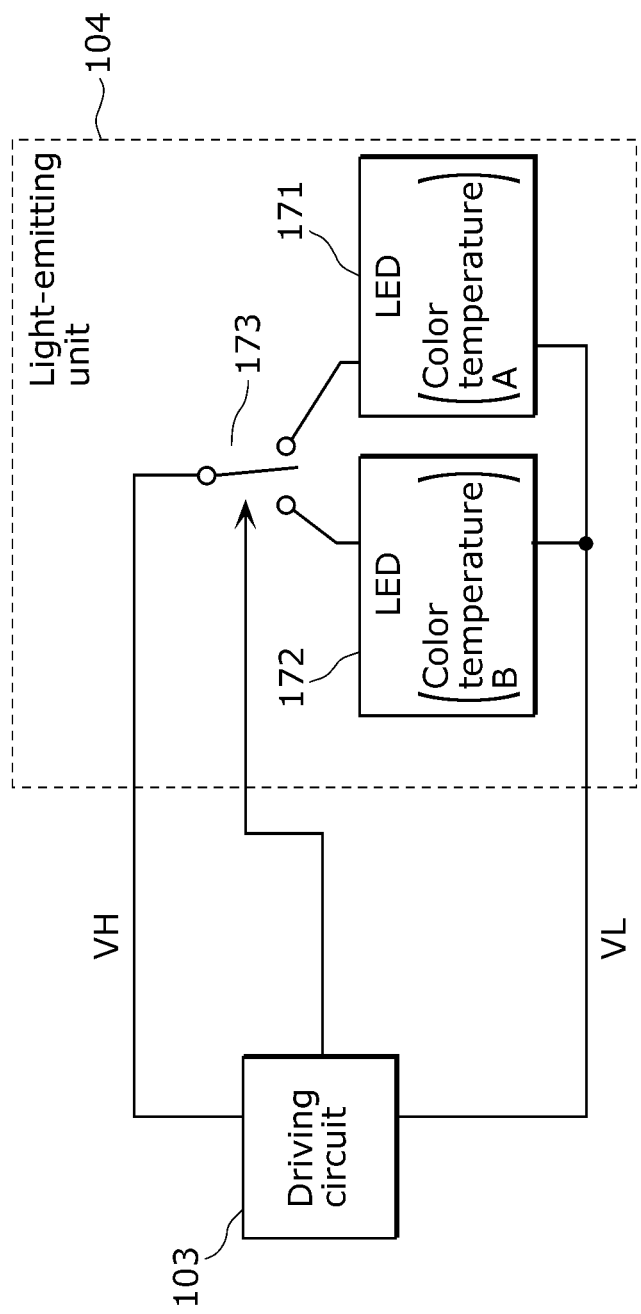
FIG. 13 is a diagram showing an exemplary configuration of a driving circuit and light-emitting units according to Embodiment 2 of the present invention.

FIG. 13 is a diagram showing an exemplary configuration of the driving circuit 103 and the light-emitting unit 104 according to this embodiment. The light-emitting unit 104 shown in FIG. 13 includes an LED 171 (the light-emitting element) which emits light at a first color temperature (X [K]) and an LED 172 which emits light at a second color temperature (X±100 [K]), and a switch 173.

The switch 173 switches between the LED 171 and the LED 172 to cause either of them to emit light. Subsequently, the driving circuit 103 varies the color temperature of the light-emitting unit 104 by operating the switch 173. It is to be noted that the switch 173 may cause either the LED 171 or the LED 172 to emit light in the normal lighting period and cause both the LED 171 and the LED 172 to emit light in the color-control period. Moreover, the switch 173 may cause both the LED 171 and the LED 172 to emit light in the normal lighting period and cause either the LED 171 or the LED 172 to emit light in the color-control period.

With the above configuration, the illumination light source 100 according to this embodiment is capable of providing the same advantage as that in Embodiment 1 described above.

Figure 14:
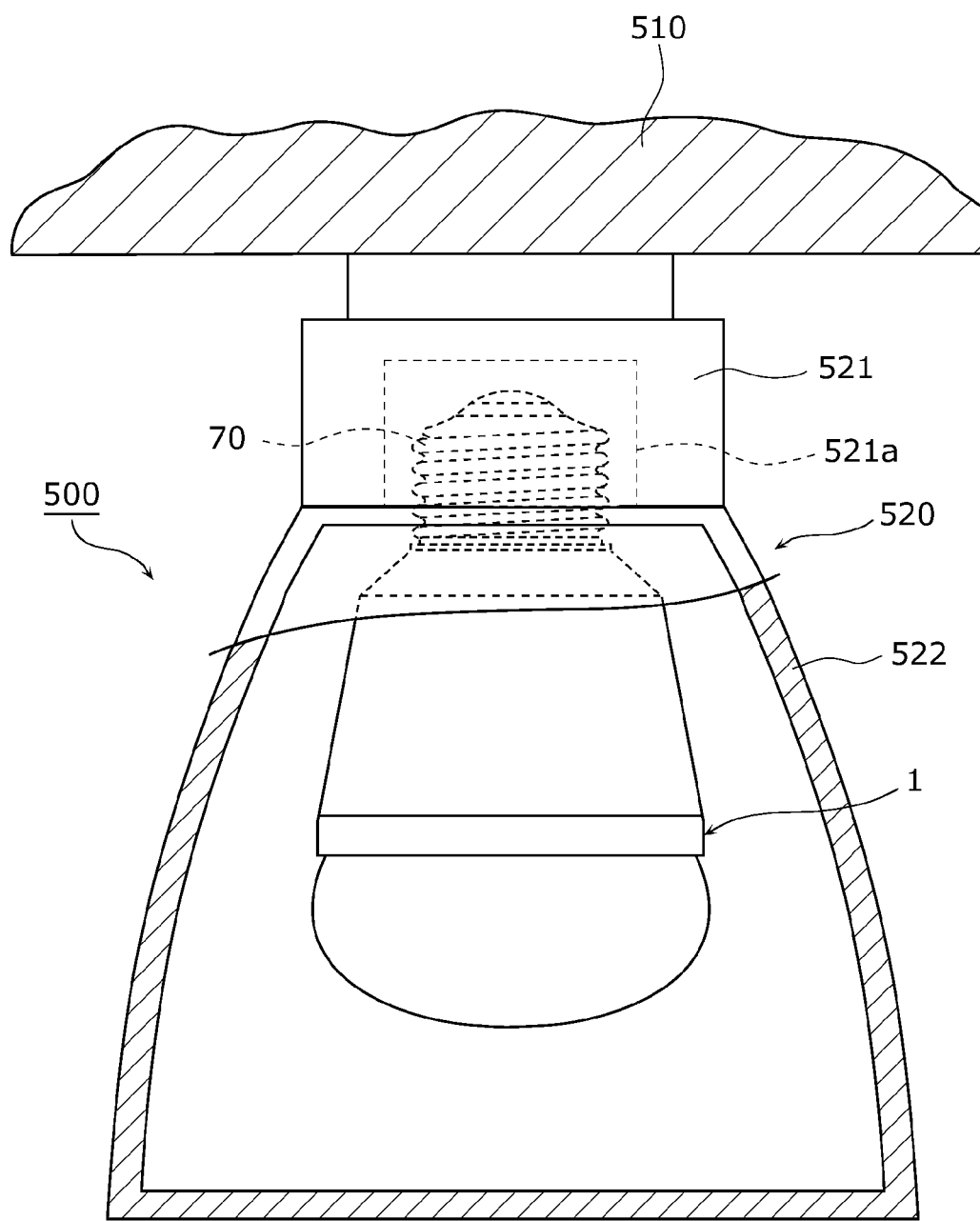
FIG. 14 is a schematic cross sectional view of a lighting apparatus according to the embodiments of the present invention.

In the embodiments of the present invention, although descriptions have been given specifically of the illumination light source, the illumination light source according to embodiments of the present invention is applicable to a lighting apparatus. Hereinafter, a lighting apparatus according to the present invention will be described with reference to FIG. 14. FIG. 14 is a schematic cross sectional view of a lighting apparatus 500 according to the present invention.

The lighting apparatus 500 according to the present invention is, for example, attached to a ceiling 510 inside a room for use. The lighting apparatus 500 includes an illumination light source 1 and a lighting device 520. The illumination light source 1 is the illumination light source according to the above embodiments (the illumination light source 1 or the illumination light source 100).

The lighting device 520 turns ON/OFF the illumination light source 1. The lighting device 520 includes a device body 521 to be attached to the ceiling 510 and a lamp cover 522 which covers the illumination light source 1.

The device body 521 has a socket 521a to which a base 70 of the illumination light source 1 is screwed, and supplies predetermined power to the illumination light source 1 via the socket 521a.

It is to be noted that the lighting apparatus 500 described here is an example, and any lighting apparatus having the socket 521a to which the base 70 of the illumination light source 1 is screwed is sufficient. Moreover, although the lighting apparatus 500 shown in FIG. 14 includes a single illumination light source, the lighting apparatus may include plural, for example, two or more illumination light sources.

Moreover, although the example in which the illumination light source is an LED light bulb has been described in the above description, the present invention can be applicable to illumination light sources having other shapes. It is to be noted that a functional configuration of the illumination light source described below is the same as the configuration shown in FIG. 2.

The following describes a configuration in the case where the present invention is applied to a straight tube LED lamp.

Figure 15:
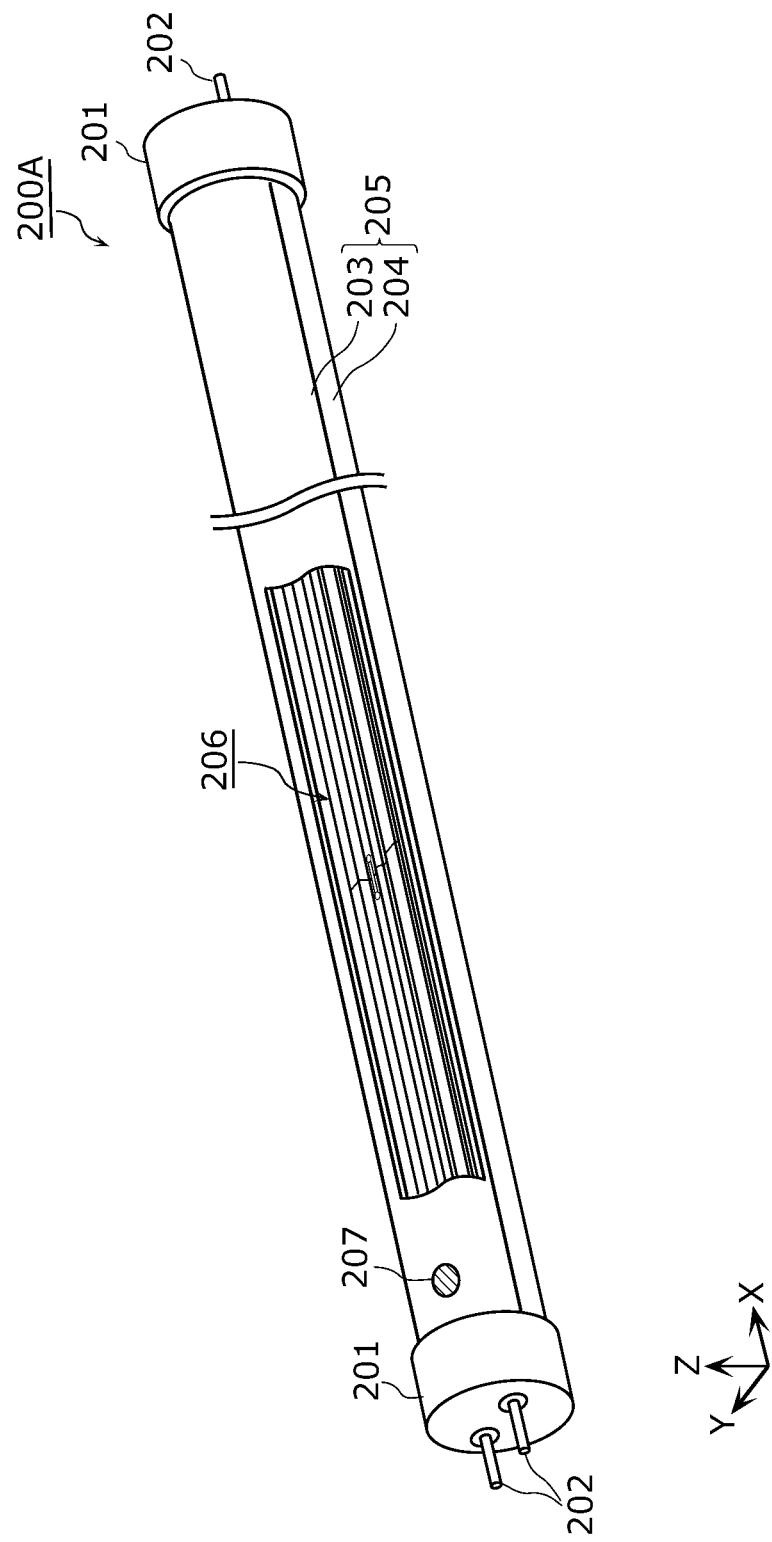
FIG. 15 is a perspective view of an illumination light source according to a variation of the embodiments of the present invention.

FIG. 15 is a perspective view showing an outer view of a straight tube LED lamp as an example of the illumination light source according to the present invention. An illumination light source 200A is a straight tube LED lamp that has approximately the same shape as a conventional general straight tube fluorescent lamp using a coil electrode. It is to be noted that FIG. 15 shows inside the illumination light source 200A with a part of a housing 205 cutaway.

As shown in FIG. 15, the illumination light source 200A includes the housing 205, two bases 201, a base pin 202, and plural LED modules 206. The base pin 202 is provided for each of the bases 201.

The housing 205 is a hollow housing (envelope) for containing the LED module 206. The housing 205 has a long shape. The housing 205 has an opening at each end.

The housing 205 includes a cover 203 and a base platform 204. The cover 203 and the base platform 204 extend along the long direction of the housing 205. Hereinafter, the long direction of the housing 205 is referred to as a housing long direction.

The cover 203 is made of translucent plastic. It is to be noted that the material of the cover 203 is not limited to the plastic, but may be acrylic, polycarbonate, glass, etc.

The cover 203 has the same shape from an end to the other end of the cover 203 in the long direction. That is, the cover 203 has a long shape. Moreover, the base platform 204 has the same shape from an end to the other end of the base platform 204 in the long direction. The cover 203 covers the LED module 206 as a light-emitting module.

The cover 203 has an approximately circular sectional shape. The cover 203 has a thickness of 0.7 mm, for example. However, the sectional shape of the cover 203 is not specifically limited, but may be a shape made of combinations of straight lines and curved lines such as a square shape.

Moreover, a diffusion treatment is preferably applied to the outer surface or the inner surface of the cover 203. With this, light emitted from the LED module 206 can be diffused. The diffusion treatment includes, for example, applying silica, calcium carbonate, etc. to the inner surface of the cover 203, using a resin material such as polycarbonate in which a diffusion material is diffused as a material for the cover 203, providing protrusion and recession by forming a groove, etc. on the inner surface of the cover 203, and the like.

The LED module 206 corresponds to the light-emitting unit 104 shown in FIG. 2. The LED module 206 is, for example, of a chip on board (COB) type, and includes a mounting board and one or more light-emitting elements mounted on the mounting board. It is to be noted that a wavelength conversion member including phosphor, etc. may be provided to cover the light-emitting elements. The LED module 206 is a linear light source which emits light linearly.

A sensor unit 207 detects presence or absence of a person. The sensor unit 207 corresponds to the disturbance detecting unit 101 shown in FIG. 2.

It is to be noted that the position of the sensor unit 207 is not limited to the example shown in FIG. 15, but may be any position. For example, as in an illumination light source 200B shown in FIG. 16, the sensor unit 207 may be positioned at the base 201.

Moreover, the present invention may be applied to an illumination light source having the following shape.

Figure 17A:
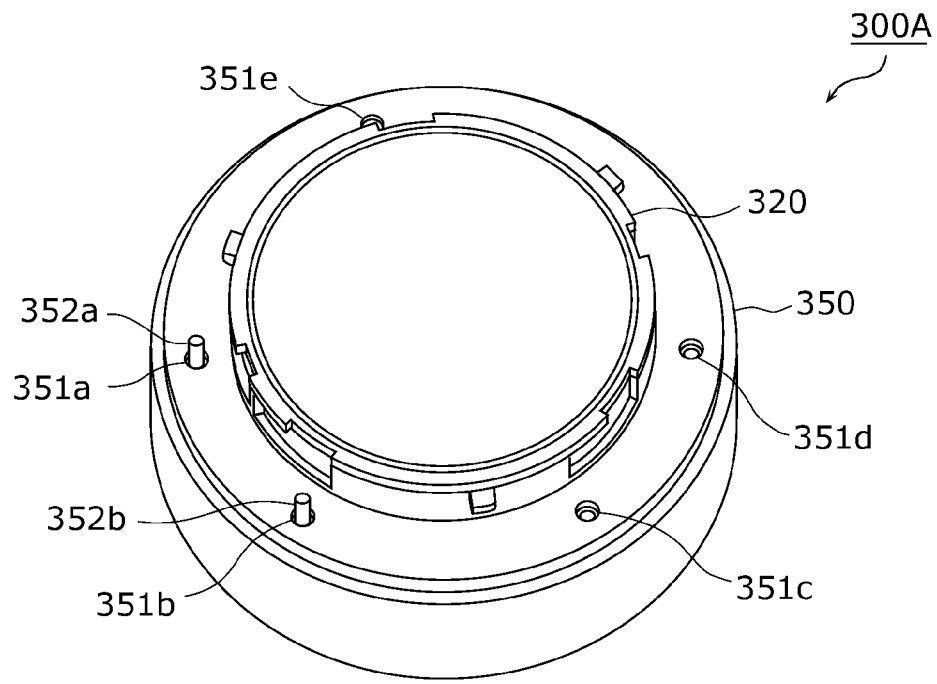
FIG. 17A is a perspective view of an illumination light source according to a variation of the embodiments of the present invention.
Figure 17B:
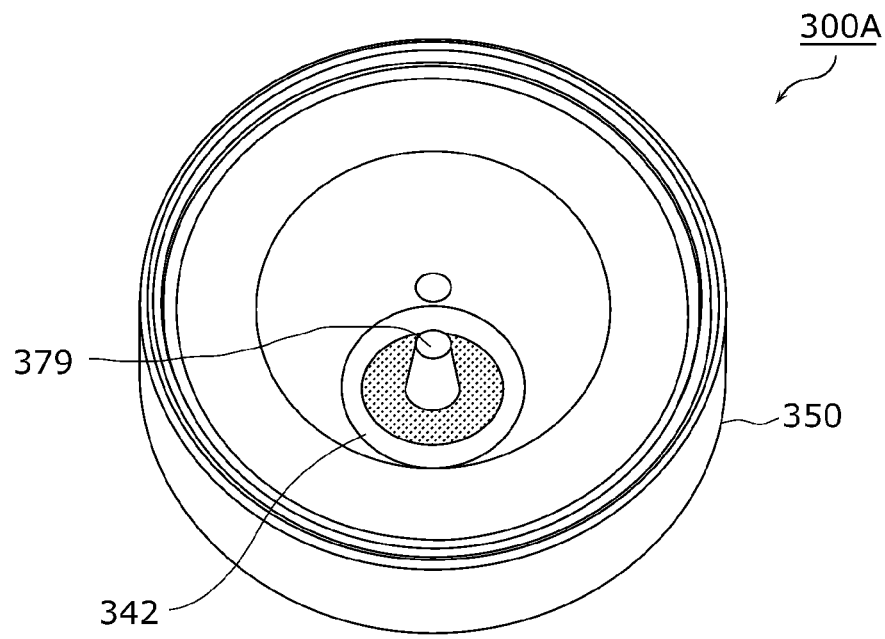
FIG. 17B is a perspective view of the illumination light source according to the variation of the embodiments of the present invention.

FIGS. 17A and 17B are perspective views showing outer views of an illumination light source 300A according to a variation of this embodiment. Specifically, FIG. 17A is a perspective view of the illumination light source 300A seen from obliquely above, and FIG. 17B is a perspective view of the illumination light source 300A seen from obliquely below. It is to be noted that although an opening of the illumination light source 300A is closed with a cover, the inside of the illumination light source 300A is seen through in FIG. 17B because the cover is transparent.

Here, a side of the illumination light source 300A from which light is emitted (hereinafter referred to as a light-emitting side) is downside in FIG. 17A, and the light-emitting side is upside in FIG. 17B. Hereinafter, the light-emitting side is referred to as a front side (front), the side opposite the light-emitting side is referred to as a backside (back), and a direction to cross the front-back direction is referred to as a lateral side.

As shown in these diagrams, the illumination light source 300A is an LED lamp overall shape of which is disk-like or flat. Specifically, the illumination light source 300A is an LED lamp having a GH76p base. More specifically, the illumination light source 300A has an outer diameter of from 50 to 100 mm and a height of from 30 to 50 mm, and in the case where the illumination light source 300A is a 20W LED lamp, for example, the outer diameter is 90 mm and the height is 45 mm.

Moreover, the illumination light source 300A includes a supporting base 320 to be attached to a lighting device (not shown), an LED module 342 which is a light-emitting module provided at the front side of the supporting base 320, and a housing 350 connected to the supporting base 320.

Moreover, the backside face (a lighting-device-side face) of the housing 350 has five through holes 351 (through holes 351a to 351e in FIG. 17A) which are circularly formed. To the through holes 351, electrical connecting pins 352 for electrically connecting the illumination light source 300A with the lighting device are inserted. It is to be noted that the electrical connecting pins 352a and 352b are inserted into the through holes 351a and 351b in FIG. 17A, and electrical connecting pins 352c to 352e (not shown) are respectively inserted into the through holes 351c to 351e. Here, for example, the electrical connecting pins 352a and 352b are pins for a power supply, the electrical connecting pins 352c and 352d are pins for light control, and the electrical connecting pins 352e is a pin for grounding. It is to be noted that when the light control is not performed, for example, the through holes 351c and 351d are not formed or the electrical connecting pins 352c and 352d are not inserted. Moreover, it may be that the through hole 351 to which the electrical connecting pin 352 is not inserted is closed or not formed.

Figure 18:
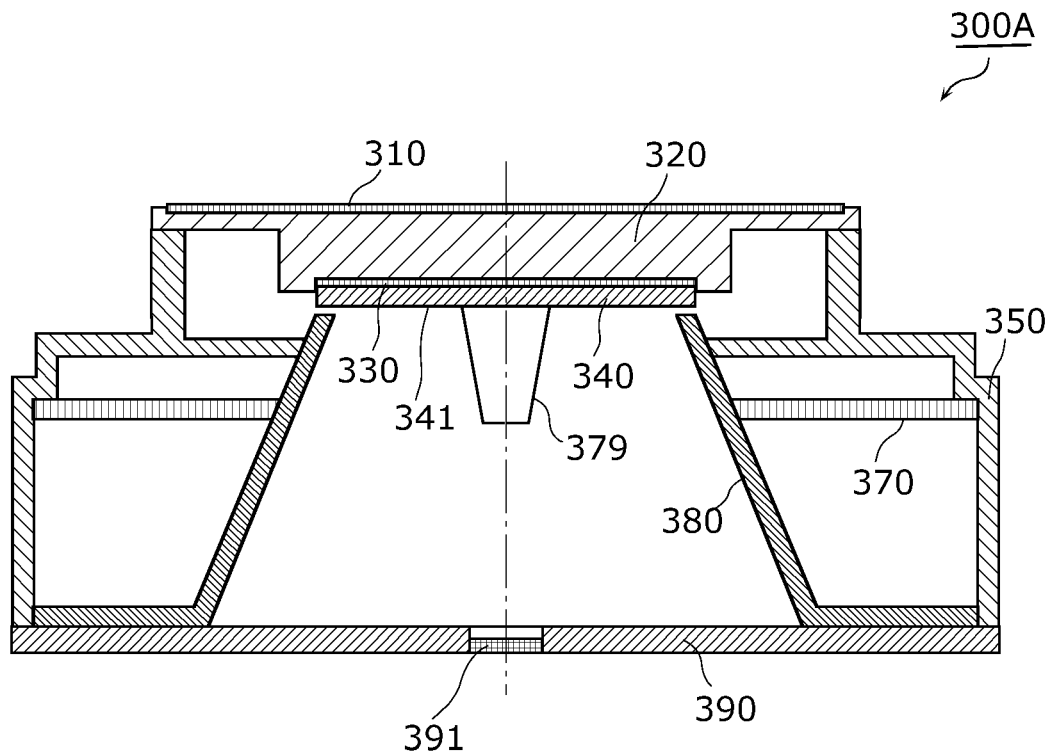
FIG. 18 is a schematic cross sectional view of the illumination light source according to the variation of the embodiments of the present invention.

FIG. 18 is a schematic sectional view when the illumination light source 300A is cut in a front-back direction.

As shown in FIG. 18, the illumination light source 300A includes a heat-conducting sheet 310, a supporting base 320, a heat-conducting sheet 330, an LED module 342, a housing 350, a circuit board 370, a sensor unit 379, a mirror 380 and a translucent cover 390.

The LED module 342 corresponds to the light-emitting unit 104 shown in FIG. 2. The LED module 342 is, for example, of a COB type and includes a mounting board 340 and a light-emitting unit 341. The light-emitting unit 341 includes one or more light-emitting elements mounted on the mounting board 340. It is to be noted that a wavelength conversion member including phosphor, etc. may be provided to cover the light-emitting elements.

The housing 350 is a cylindrical flat-shaped (disc-shaped) housing that is short in the front-back direction and surrounds the light-emitting side of the illumination light source 300A. Specifically, the housing 350 has openings at a front portion and a back portion, and the back portion of which is fixed to the supporting base 320. Moreover, the translucent cover 390 is attached to the front portion of the housing 350. Moreover, inside the housing 350, the heat-conducting sheet 330, the LED module 342, the circuit board 370, and the mirror 380 are arranged. Furthermore, as shown in FIG. 17A, the housing 350 has the electrical connecting pin 352 which is a power receiving unit for receiving power that is used for causing an LED chip mounted on the mounting board 340 to emit light. That is, the electrical connecting pin 352 for a power supply receives AC power, and the received AC power is provided to the circuit board 370 via a lead wire.

The circuit board 370 is positioned at the lateral side of the light-emitting unit 341 and is a power source circuit board for causing the light-emitting element included in the light-emitting unit 341 to emit light.

Specifically, on the circuit board 370, circuit elements (electronic components) for converting the AC power received from the electrical connecting pin 352 for a power supply to DC power, etc. are mounted. That is, an input unit of the circuit board 370 and the electrical connecting pin 352 for a power supply are electrically connected through the lead wire, etc. Moreover, an output unit of the circuit board 370 and each of the light-emitting unit 341 and the sensor unit 379 of the mounting board 340 are electrically connected through the lead wire, etc. The DC power converted in the circuit board 370 is supplied to the light-emitting unit 341 and the sensor unit 379 via a power supply terminal.

The sensor unit 379 is a human detection sensor for detecting infrared light. The sensor unit 379 corresponds to the disturbance detecting unit 101 shown in FIG. 2.

It is to be noted that although the sensor unit 379 has a shape of a frustum of circular cone in the diagram, any shapes may be applicable. Moreover, the sensor unit 379 is not limited to the human detection sensor, but may be an illuminance sensor.

The mirror 380 is positioned at the light-emitting side of the mounting board 340 and is an optical member for reflecting light emitted from the light-emitting unit 341. That is, the mirror 380 reflects forward the light emitted from the light-emitting element in light-emitting unit 341 provided on the mounting board 340.

The translucent cover 390 is a flat-shaped cylindrical member having a bottom and attached to a front face of the housing 350 and covers the front-side opening of the housing 350 for the purpose of protecting the members arranged inside the housing 350. The translucent cover 390 has an infrared transmissive window 391 for transmitting infrared light in front of the sensor unit 379. As the material for the infrared transmissive window 391, for example, a material that transmits infrared light such as a transparent polyethylene cover, etc. may be used. It is to be noted that the translucent cover 390 may transmit the infrared light. In this case, it is not necessary to provide the infrared transmissive window 391.

Figure 19:
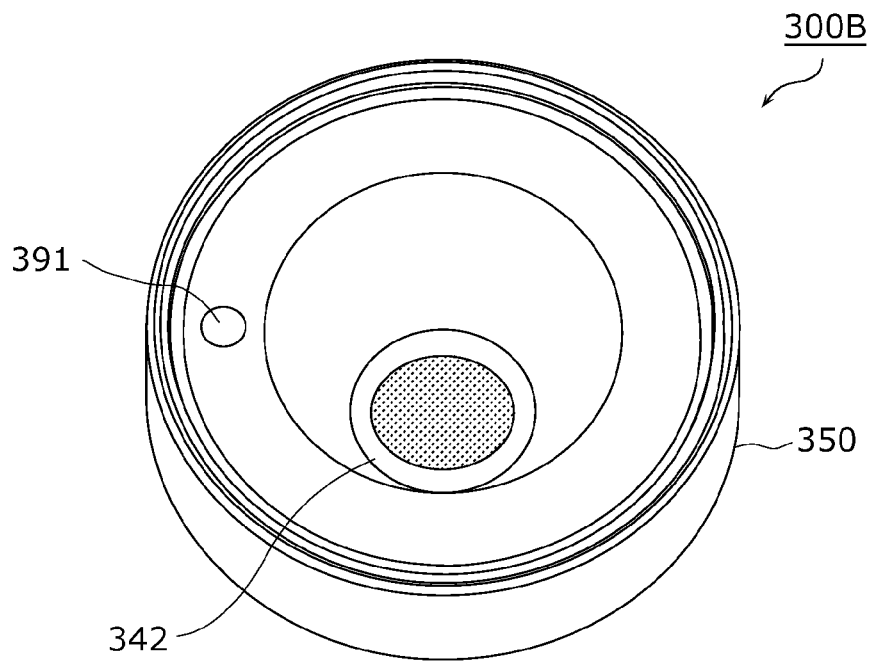
FIG. 19 is a perspective view of an illumination light source according to a variation of the embodiments of the present invention.

It is to be noted that the position of the sensor unit 379 is not limited to the example shown in FIGS. 17A, 17B, and 18, but the sensor unit 379 may be positioned anywhere. For example, as in an illumination light source 300B shown in FIGS. 19 and 20, the sensor unit 379 may be disposed at a lateral position of the LED module 342. In this case, it is possible to suppress the sensor unit 379 limiting light distribution from the LED module 342.

It is to be noted that although the above illumination light source has a configuration in which the circuit unit (the circuit board 370) including a power source circuit for turning ON the illumination light source is built into a lamp unit, each of the illumination light source and the circuit unit may constitute an individual unit. In this case, the circuit unit is built into a lighting device, etc. to which the illumination light source is attached.

Figure 21:
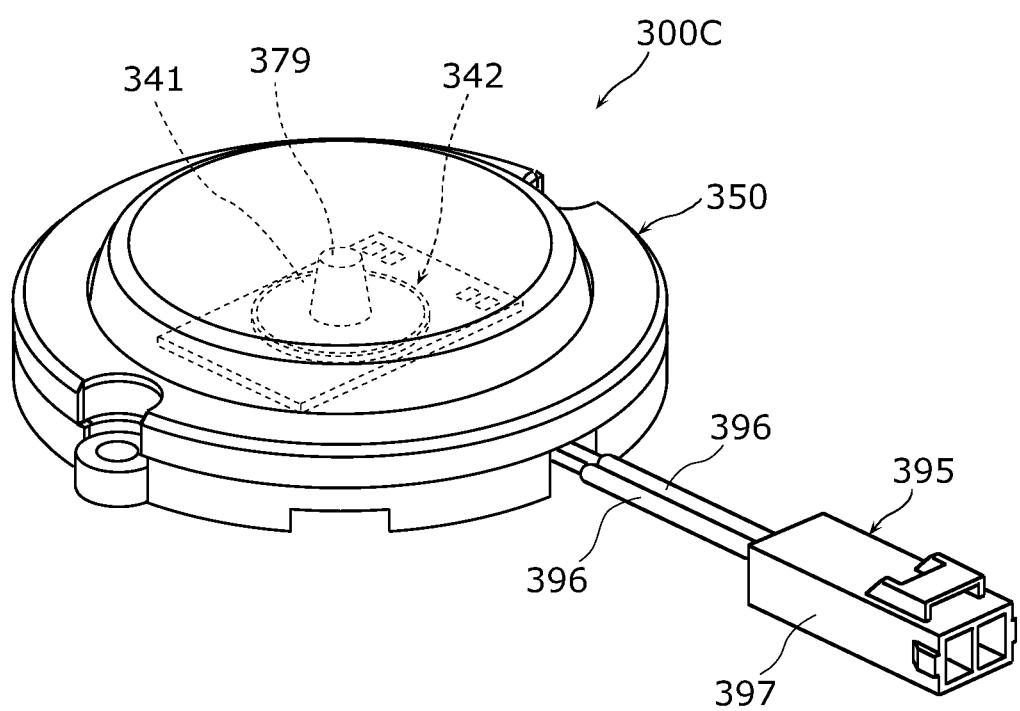
FIG. 21 is a perspective view of an illumination light source according to a variation of the embodiments of the present invention.

FIG. 21 is a perspective view of an illumination light source 300C which does not have the circuit unit built-in.

In contrast to the configuration of the illumination light source 300A, the illumination light source 300C does not include the circuit unit therein. Moreover, the illumination light source 300C includes a wiring member 395.

The wiring member 395 has a pair of lead wires 396 electrically connected to the light-emitting unit 341. The lead wires 396 extend to outside the illumination light source 300C and a connector 397 is attached to the ends of the lead wires 396. The connector 397 is connected to the circuit unit built into the lighting device. It is to be noted that in addition to the lead wires 396 and the connector 397 shown in FIG. 21, a power line and a signal line for the sensor unit 379 are provided (not shown).

It is to be noted that the position of the sensor unit 379 is not limited to the example shown in FIG. 21, but may be a lateral position of the LED module 342. In this case, it is possible to suppress the sensor unit 379 limiting light distribution from the LED module 342.

The following describes a configuration in the case where the present invention is applied to a clear LED light bulb.

Figure 22:
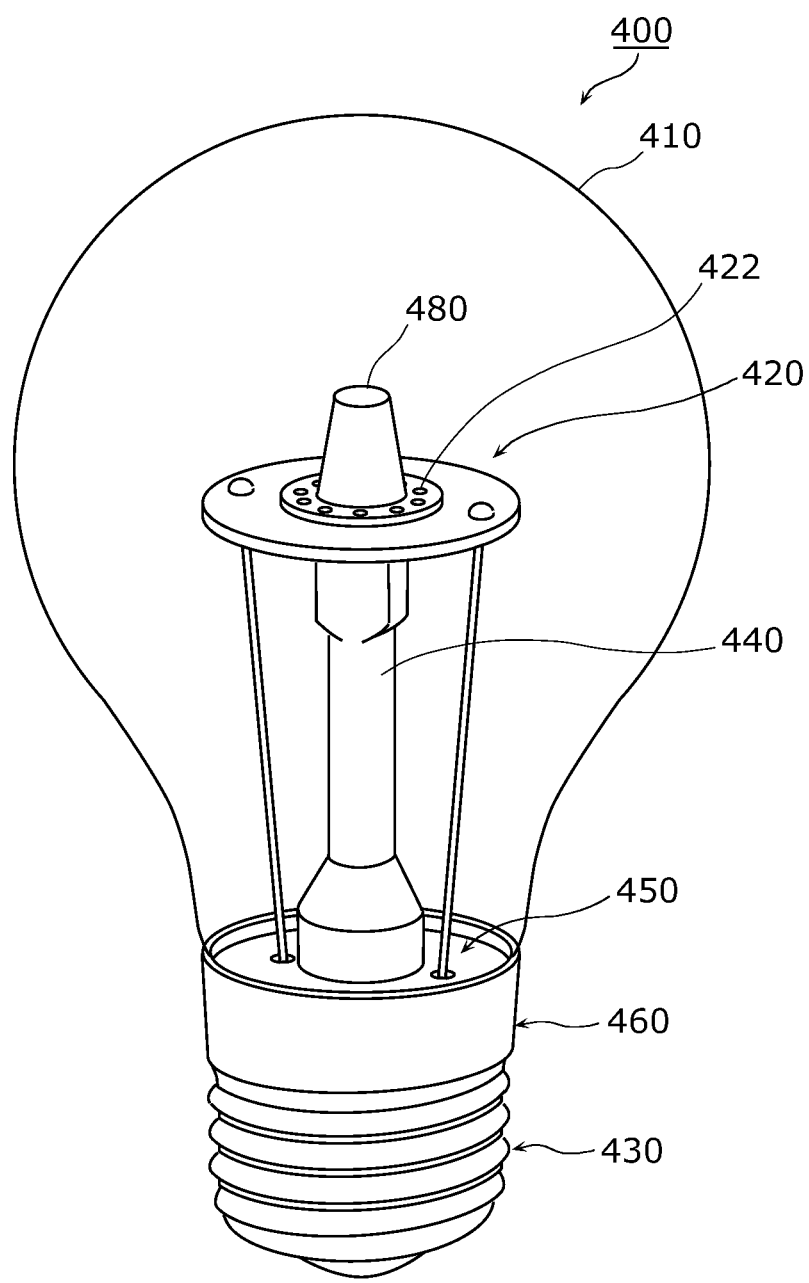
FIG. 22 is a perspective view of an illumination light source according to a variation of the embodiments of the present invention.

FIG. 22 is a perspective view showing an outer view of the clear LED light bulb as an example of the illumination light source according to the present invention.

As shown in FIG. 22, an illumination light source 400 is a bulb-shaped lamp substituted for an incandescent light bulb, and an LED lamp using LEDs as semiconductor light-emitting elements which are used as a light source. The illumination light source 400 includes, as the main structural elements, a translucent globe 410, an LED module 420 which is a light-emitting module including a semiconductor light-emitting element 422 as the light source, a base 430 which receives power from outside, a supporting member 440 which supports the LED module 420 in the globe 410, and a sensor unit 480.

A case 460 is attached to an open-side end of the globe 410. The case 460 has a cylindrical shape. The base 430 is attached to an end of the case 460. Moreover, an opening of the other end of the case 460 is closed by a case cover 450. A circuit unit is contained inside the case 460. The supporting member 440 stands on the case cover 450 extending toward inside the globe 410, and the LED module 420 is attached to an end of the supporting member 440 in the extending direction.

The globe 410 has a shape similar to an incandescent light bulb (also referred to as a glass bulb). Here, the globe 410 is of a so-called A type which has a shape similar to a common incandescent light bulb (a light bulb having a filament.)

The globe 410 is made of a translucent material. The translucent material includes a glass material or a resin material such as acrylic. Here, the globe 410 is made of, for example, a glass material.

It is to be noted that the globe 410 needs not necessarily to have an A-type shape. For example, the globe 410 may have a shape of a G or E type.

The LED module 420 corresponds to the light-emitting unit 104 shown in FIG. 2. The LED module 420 is of, for example, a COB type, and includes a mounting board, one or more light-emitting elements (the semiconductor light-emitting elements 422) mounted on the mounting board. It is to be noted that a wavelength conversion member including phosphor, etc. may be provided to cover the light-emitting elements.

Moreover, the mounting board may be made of a translucent material such as translucent ceramic so that the light can be emitted from the mounting board side, too. With this, an illumination light source much similar to a conventional incandescent light bulb can be obtained.

The sensor unit 480 detects presence or absence of a person. The sensor unit 480 corresponds to the disturbance detecting unit 101 shown in FIG. 2.

Here, the inventors have conducted the following experiment and have found the following problems in the conventional technique.

Figure 23:
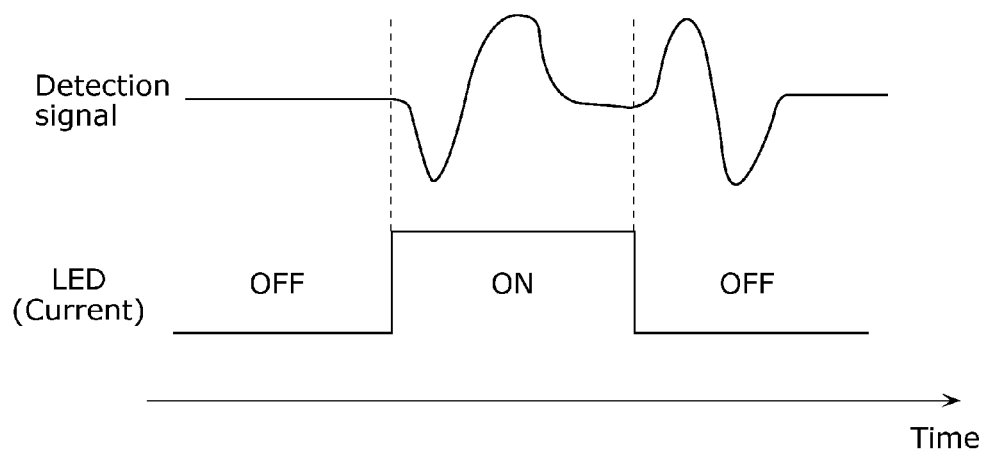
FIG. 23 is a diagram for illustrating a malfunction of the illumination light source having a sensor unit according to the embodiments of the present invention.

FIG. 23 is a diagram showing a lighting state (current) of the LED and a detection signal which is an output of the human detection sensor in the case where a part other than a lens of the human detection sensor is not covered with a non-translucent member. As shown in FIG. 23, the human detection sensor malfunctions when the LED is turned ON/OFF.

Figure 24:
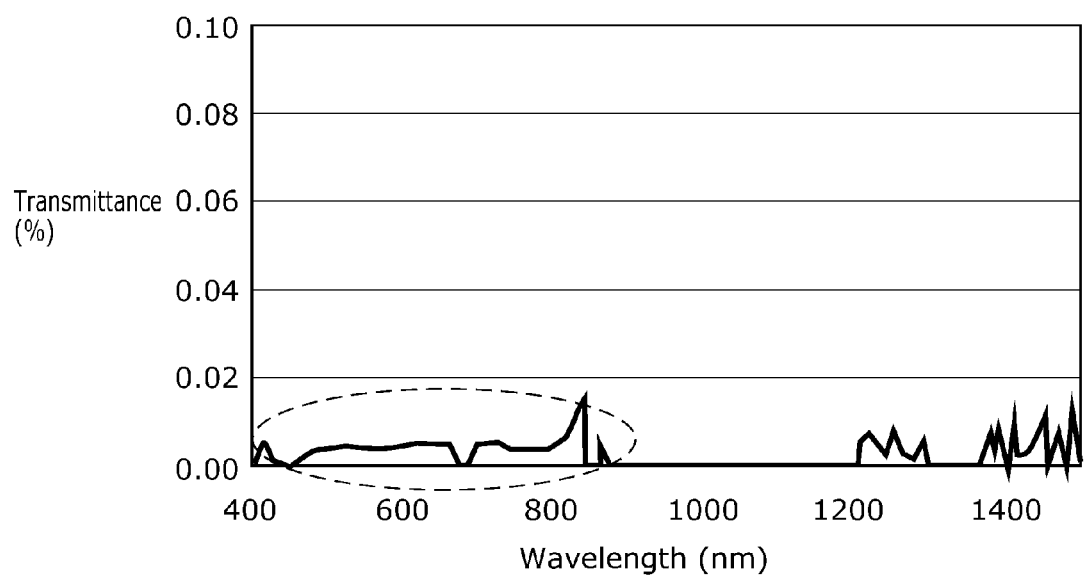
FIG. 24 is a diagram for illustrating transmittance of visible light through a silicone infrared filter according to the embodiments of the present invention.

FIG. 24 is a diagram showing transmittance of visible light through a silicone infrared filter used for the human detection sensor. As shown in FIG. 24, the silicone infrared filter slightly transmits light in a wavelength range of light emitted from a white LED. Moreover, as described above, the human detection sensor and the light-emitting unit (LED) are positioned relatively close to each other in a lighting apparatus having the human detection sensor integrated. With this, turning ON/OFF the LED influences the human detection sensor. Moreover, this phenomenon does not occur when the part other than the lens of the human detection sensor is covered with a non-translucent member.

Moreover, in the case where the light is turned ON according to the detection signal from the human detection sensor as in the illumination light source according to the above embodiments, the light is turned ON again because the human detection sensor malfunctions when the light is turned OFF due to the above phenomenon. This causes a malfunction that the illumination light source is not turned OFF.

Figure 25:
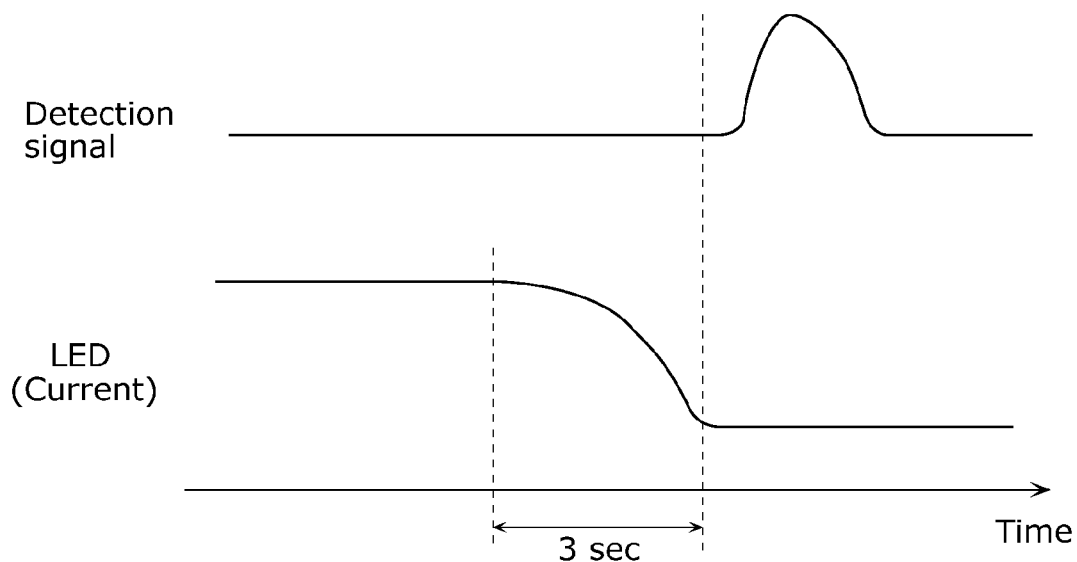
FIG. 25 is a diagram showing a state of light emission of an LED and a detection signal of a sensor unit according to the embodiments of the present invention.
Figure 26:
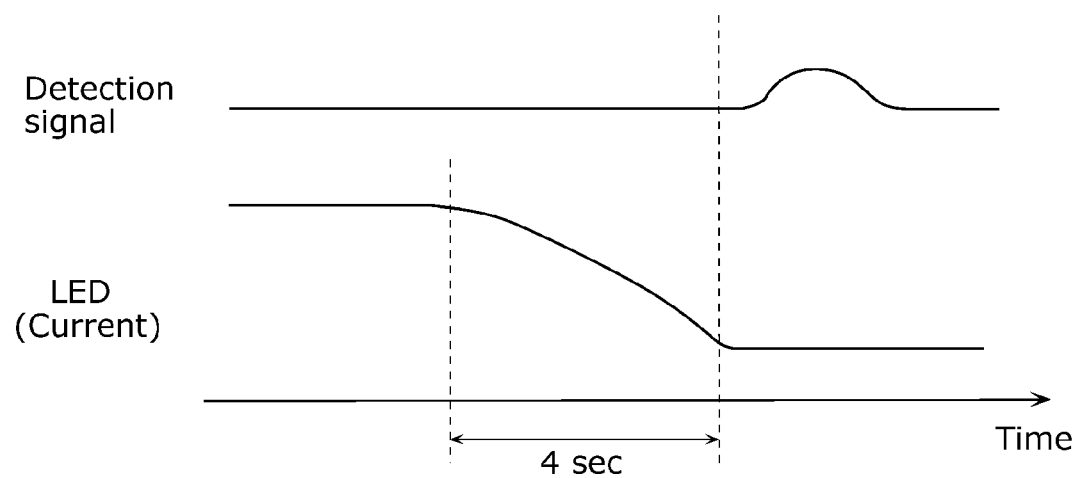
FIG. 26 is a diagram showing a state of light emission of the LED and the detection signal of the sensor unit according to the embodiments of the present invention.
Figure 27:
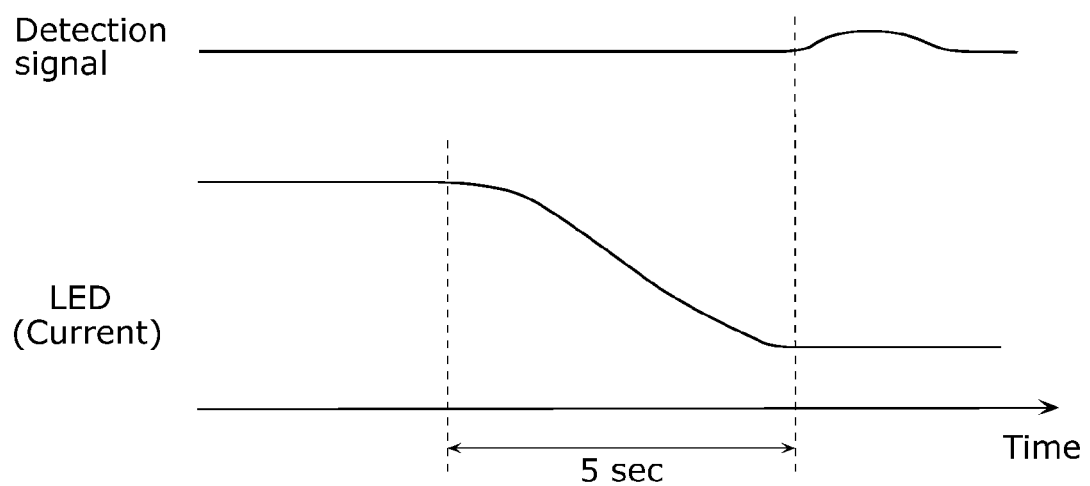
FIG. 27 is a diagram showing a state of light emission of the LED and the detection signal of the sensor unit according to the embodiments of the present invention.

FIGS. 25, 26, and 27 are diagrams showing a lighting state (current) and a detection signal when the LED is turned OFF. FIGS. 25 to 27 show different turning-OFF periods each of which is a transition period of time from the time when the LED is in a light-emitting state to the time when the LED enters a non-light-emitting state. Specifically, the turning-OFF period is three seconds in FIG. 25, the turning-OFF period is four seconds in FIG. 26, and the turning-OFF period is five seconds in FIG. 27.

As seen from FIGS. 25 to 27, the malfunction of the human detection sensor is suppressed by elongating the turning-OFF period. Specifically, the malfunction may occur when the turning-OFF period is three seconds, but the malfunction does not occur when the turning-OFF period is four seconds.

That is, the above malfunction can be suppressed by continuously decreasing the illuminance when turning OFF the light as in a period from t03 to t04 shown in FIG. 11. It is to be noted that the case where the illuminance is gradually decreased as shown in FIG. 3 also provides the same advantage. Specifically, the turning-OFF period is a period from t02 to t03 in the example shown in FIG. 3, and the turning-OFF period is a period from t02 to t04 in the example shown in FIG. 11.

Moreover, the length of the turning-OFF period which can prevent the malfunction is different according to luminance at the time when the light is ON (an amount of a variation of the luminance at the time when the light is turned OFF). Specifically, the higher the luminance at the time when the light is ON is, the longer the required turning-OFF period is. Moreover, even though the color temperature is different when the light is ON, the required length of the turning-OFF period is the same. Moreover, the required length of the turning-OFF period is different according to the sensitivity of the human detection sensor.

The sensitivity of the human detection sensor used in the above experiment is relatively high among currently used human detection sensors. Moreover, considering the sensitivities and ranges of the luminance at the time when the light is ON of plural kinds of human detection sensors currently used, the turning-OFF period is preferably three to ten seconds.

Figure 16:
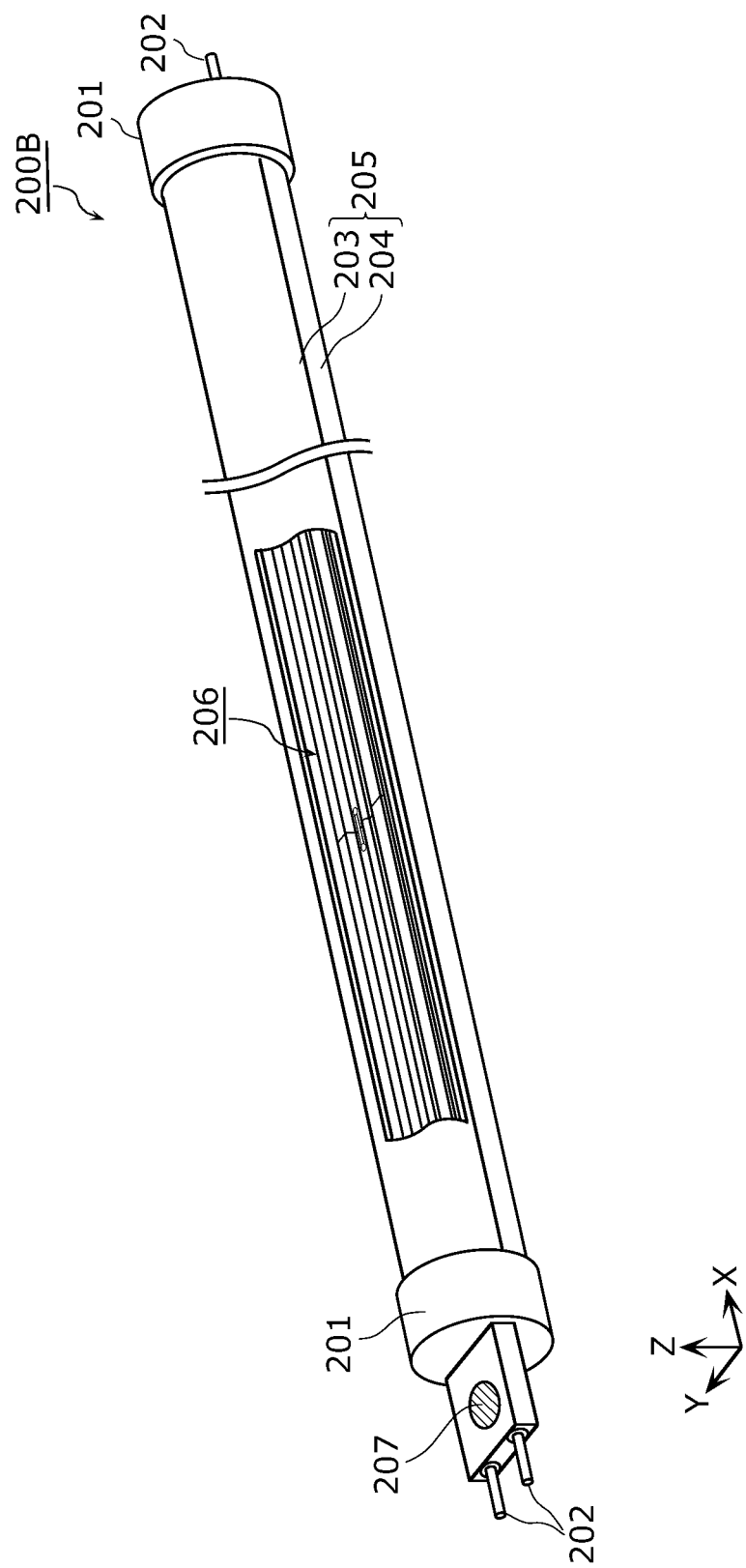
FIG. 16 is a perspective view of an illumination light source according to a variation of the embodiments of the present invention.
Figure 20:
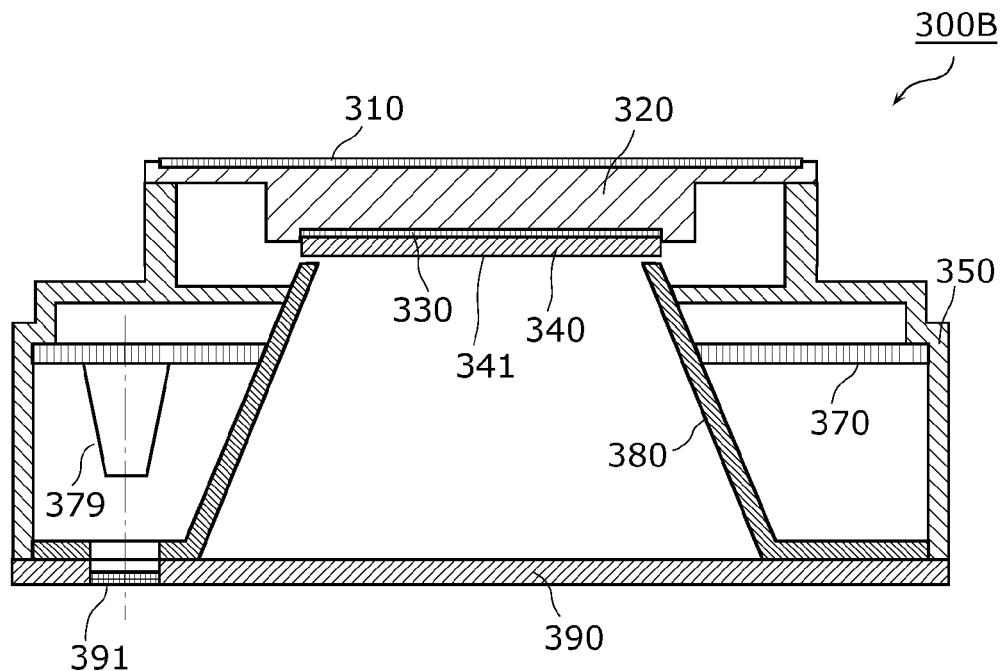
FIG. 20 is a schematic cross sectional view of the illumination light source according to the variation of the embodiments of the present invention.

As described in the above embodiments, it is possible to prevent the malfunction of the human detection sensor at the time when the light is turned OFF by decreasing in a continuous manner or a gradual manner the illuminance when turning OFF the light. This is particularly effective when the part other than the lens is not covered with a non-translucent member. Moreover, this is also effective when the human detection sensor and the light-emitting unit (LED) are positioned close to each other. For example, when the structure shown in FIG. 15 and the structure shown in FIG. 16 are compared, the above advantage can be obtained in the structure shown in FIG. 15 more effectively. For example, when the structure shown in FIG. 18 and the structure shown in FIG. 20 are compared, the above advantage can be obtained in the structure shown in FIG. 18 more effectively.

Moreover, since the above malfunction can be prevented, for example, the human detection sensor does not need to be covered with the non-translucent member. As a result, the cost for the illumination light source can be reduced. Moreover, the flexibility of the arrangement of the human detection sensor and the light-emitting unit is increased.

Although the illumination light source according to the present invention has been described above based on the embodiments, the present invention is not limited to these embodiments.

Moreover, the present invention can also be realized as a lighting apparatus including the above illumination light source. For example, the lighting apparatus according to the present invention may include the above illumination light source and a lighting device to which the illumination light source is attached. In this case, the lighting device turns ON/OFF the illumination light source, and includes, for example, a device body which is attached to a ceiling and a cover for covering the illumination light source. Among the above elements, the device body has a socket to which the base of the illumination light source is attached and for supplying power to the illumination light source.

Moreover, all the numerals used above are examples for specifically describing the present invention, and the present invention is not limited to the exemplified numerals. Furthermore, logic levels represented by high/low or switching states represented by ON/OFF are examples for specifically describing the present invention, and different combinations of the exemplified logic levels or switching states may provide an equivalent result.

Moreover, the separation of the functional blocks in the block diagrams is a mere example, and plural functional blocks may be implemented as a single functional block or a functional block may be separated into plural functional blocks, or a part of functions may be transferred to another functional block. Moreover, functions of plural functional blocks that have similar functions may be processed by a single hardware item or software item in parallel or by time sharing.

Moreover, the circuit configurations shown in the above circuit diagrams are mere example, and the present invention is not limited to the above circuit configuration. That is, like the above circuit configuration, a circuit that is capable of realizing characteristic functions of the present invention is also included in the present invention. For example, within a range in which the same functions as those in the above circuit configuration can be realized, a configuration in which elements such as a switching device (transistor), a resistor, and a capacitor are connected to an element in series or in parallel is included in the present invention.

Moreover, at least one of the resistor and the switch may be included in a driving circuit, etc., not included in the light-emitting unit.

Moreover, the LED module is not limited to be of the COB type, but may be of a surface mount device (SMD) type. In this case, plural SMD light sources are mounted on the mounting board.

Moreover, various modifications to the embodiments that are conceived by the person skilled in the art and other embodiments obtainable by combining the structural elements in the embodiments without materially departing from the principles and spirit of the present invention are included within the scope of the present invention.

Industrial Applicability

The present invention can be widely used in a general lighting apparatus as a lamp substituted for a conventional incandescent light bulb, etc., particularly as an LED light bulb, etc.

Reference Signs List 1, 100, 200A, 200B, 300A, 300B, 300C, 400 Illumination light source
10 Light-emitting module
20, 204 Base platform
30, 410 Globe
50 Insulation case
60, 205, 350 Housing
70, 201, 430 Base
80, 207, 379, 480 Sensor unit
90 Light guiding member
101 Disturbance detecting unit
102 Timer circuit
103 Driving circuit
104 Light-emitting unit
111 Trigger signal
112 Control signal
112A Lighting switching signal
112B Gradual light-control switching signal
131 Lighting control unit
132 Power source
133 Node
135 Determining circuit
141, 151, 152, 161, 162, 171, 172 LED
142, 153, 163, R1 Resistor
143, 154, 164, 173 Switch
181, 182 Light-emitting element
202 Base pin
203 Cover
206, 342, 420 LED module
310, 330 Heat-conducting sheet
320 Supporting base
340 Mounting board
341 Light-emitting unit
351, 351a, 351b, 351c, 351d, 351e Through hole
352, 352a, 352b, 352c, 352d, 352e Electrical connecting pin
370 Circuit board
380 Mirror
390 Translucent cover
391 Infrared transmissive window
395 Wiring member
396 Lead wire
397 Connector
422 Semiconductor light-emitting element
440 Supporting member
450 Case cover
460 Case
500 Lighting apparatus
510 Ceiling
520 Lighting device
521 Device body
521a Socket
522 Lamp cover
C1 Capacitor

The invention claimed is:

1. An illumination light source comprising:
a light-emitting unit;
a disturbance detecting unit configured to detect a specific disturbance;
a timer circuit that times a first period and a second period, the first period starting from when the disturbance detecting unit detects the specific disturbance, the second period immediately following after the first period; and
a driving circuit that turns ON the light-emitting unit at a start of the first period, causes the light-emitting unit to emit light during the first period, decreases illuminance of the light-emitting unit substantially linearly during the second period, and turns OFF the light-emitting unit at an end of the second period,
wherein, a part of the disturbance detecting unit other than a lens is not covered with a non-translucent member, or the disturbance detecting unit is positioned close to the light-emitting unit.

2. The illumination light source according to claim 1, wherein the timer circuit further times a third period between the first period and the second period, and
the driving circuit causes the light-emitting unit to emit light at a first illuminance in the first period and at a second illuminance different from the first illuminance in the third period.

3. The illumination light source according to claim 1, wherein the driving circuit varies the illuminance of the light-emitting unit by varying an amount of power to be supplied to the light-emitting unit.

4. The illumination light source according to claim 3, wherein the driving circuit includes a controlling unit configured to adjust the amount of the power to be supplied to the light-emitting unit according to a control signal and varies the amount of the power to be supplied to the light-emitting unit by supplying, to the controlling unit, control signals having different values for the first period and the second period.

5. The illumination light source according to claim 3, wherein the light-emitting unit includes:
a light-emitting element;
a resistor; and
a switch that switches between connecting and not connecting the light-emitting element and the resistor in parallel, and
the driving circuit varies the amount of the power to be supplied to the light-emitting unit by operating the switch.

6. The illumination light source according to claim 1, wherein the light-emitting unit includes plural light-emitting elements, and the driving circuit varies the illuminance of the light-emitting unit by varying the number of light-emitting elements that emit light among the plural light-emitting elements.

7. The illumination light source according to claim 6, wherein the plural light-emitting elements include a first light-emitting element and a second light-emitting element, the light-emitting unit further includes
a switch that switches between connecting and not connecting the first light-emitting element and the second light-emitting element in parallel, and
the driving circuit varies the number of light-emitting elements that emit the light among the plural light-emitting elements by operating the switch.

8. The illumination light source according to claim 6,
wherein the plural light-emitting elements include a first light-emitting element and a second light-emitting element,
the light-emitting unit further includes
a switch that switches between connecting and not connecting the first light-emitting element and the second light-emitting element in series, and
the driving circuit varies the number of light-emitting elements that emit the light among the plural light-emitting elements by operating the switch.

9. The illumination light source according to claim 1, wherein the timer circuit includes a capacitor and a resistor, and times the first period and the second period using a time constant of the capacitor and the resistor.

10. The illumination light source according to claim 1, wherein the light-emitting unit includes a light-emitting diode.

11. A lighting apparatus comprising
the illumination light source according to claim 1.

12. The illumination light source according to claim 2, wherein the second illuminance is higher than the first illuminance.

13. The illumination light source according to claim 1, wherein the driving circuit causes the light-emitting unit to emit light at a first color temperature in the first period and at a second color temperature different from the first color temperature in the second period.

* * * * *